(12) United States Patent
Popa-Simil et al.

(10) Patent No.: US 8,067,758 B2
(45) Date of Patent: Nov. 29, 2011

(54) NANO-STRUCTURED NUCLEAR RADIATION SHIELDING

(76) Inventors: Liviu Popa-Simil, Los Alamos, NM (US); Claudiu Iulian Muntele, Huntsville, AL (US)

( * ) Notice: Subject to any disclaimer, the term of this patent is extended or adjusted under 35 U.S.C. 154(b) by 548 days.

(21) Appl. No.: 12/157,827

(22) Filed: Jun. 13, 2008

(65) Prior Publication Data
US 2011/0001065 A1   Jan. 6, 2011

Related U.S. Application Data

(60) Provisional application No. 60/934,412, filed on Jun. 13, 2007.

(51) Int. Cl.
*G21F 1/00* (2006.01)
*G21F 3/02* (2006.01)
(52) U.S. Cl. ............... 250/515.1; 250/505.1; 250/516.1; 250/517.1; 977/902; 977/948; 977/961
(58) Field of Classification Search ............... 250/505.1, 250/506.1, 507.1, 515.1, 516.1, 518.1, 519.1; 977/902, 948, 961
See application file for complete search history.

(56) References Cited

U.S. PATENT DOCUMENTS

| 6,713,774 B2 * | 3/2004 | DeSteese et al. .......... 250/505.1 |
| 2005/0211930 A1 * | 9/2005 | DeMeo et al. .............. 250/516.1 |
| 2007/0297082 A1 * | 12/2007 | Peng et al. ...................... 360/59 |

* cited by examiner

*Primary Examiner* — Robert Kim
*Assistant Examiner* — Nicole Ippolito Rausch

(57) ABSTRACT

The present (or current) nuclear shielding is bulky and difficult to handle due to the reduced stopping power of the neutral radiations (X, gamma, n) in materials. It is proven that these radiations are reflecting at grazing incidence angles on special substrates called super-mirrors that contain nano-layers of various materials. The usage of nano-structures in an ordered manner or of nano-tubes may create inside the nano-structure the super-mirror reflection conditions and makes these nano-structures act like wave-guide for this neutral radiation driving it and turning at angles greater than 90 degrees requiring a total thickness a few microns only. The usage of ferro or piezo electric nano-structures generates a "shield" structure that has the wave-guides inside with the path dependent on a control voltage. The resultant device is a kind of shield that can be applied inside the core for nuclear reactor criticality control, making an electric control of the power level by adjusting the shielding transmission or outside for minimizing the nuclear reactor shielding. Other devices such as X, n imaging device, or radiation funneling to increase the efficiency of thin absorbents use are some of the potential applications.

19 Claims, 21 Drawing Sheets

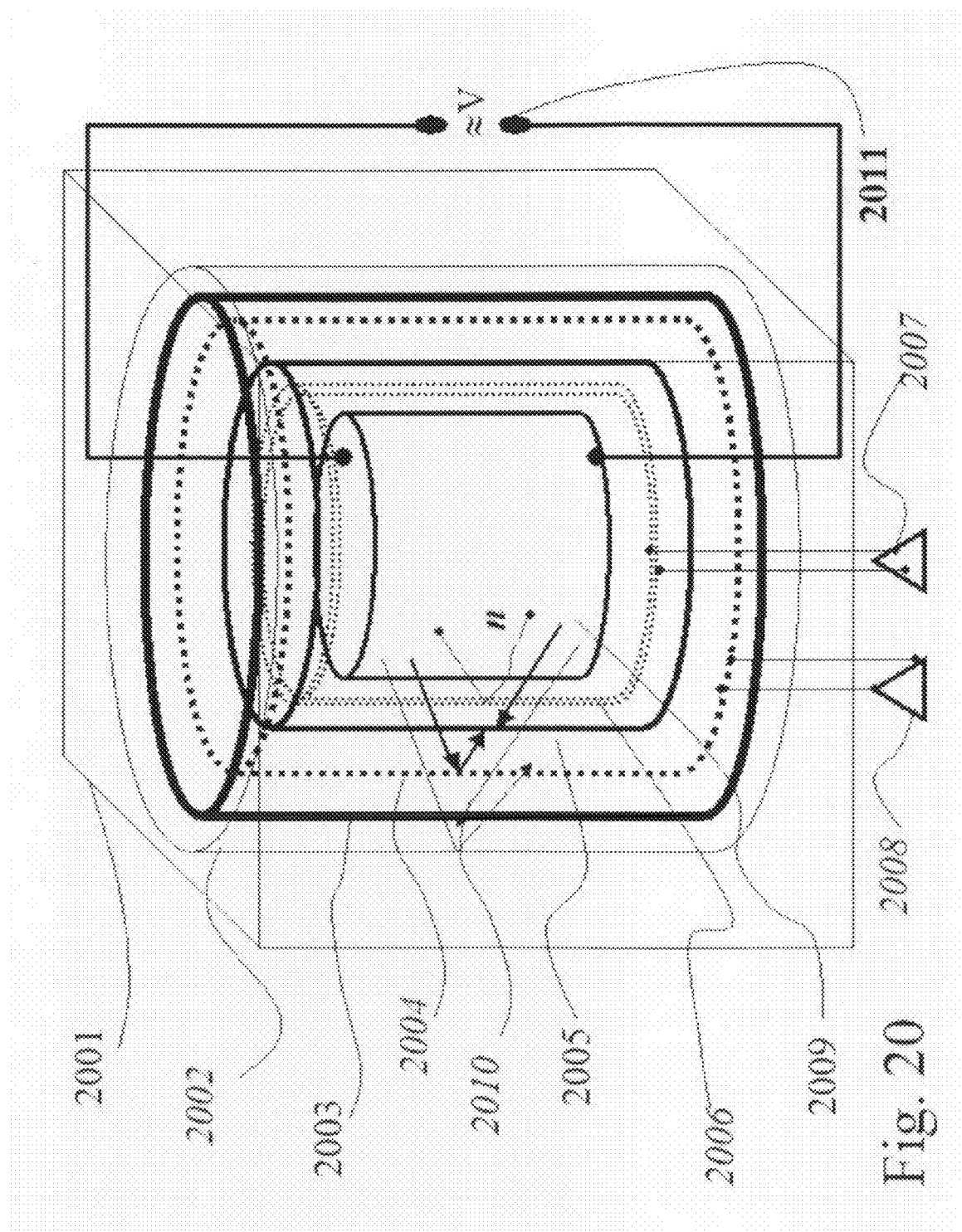

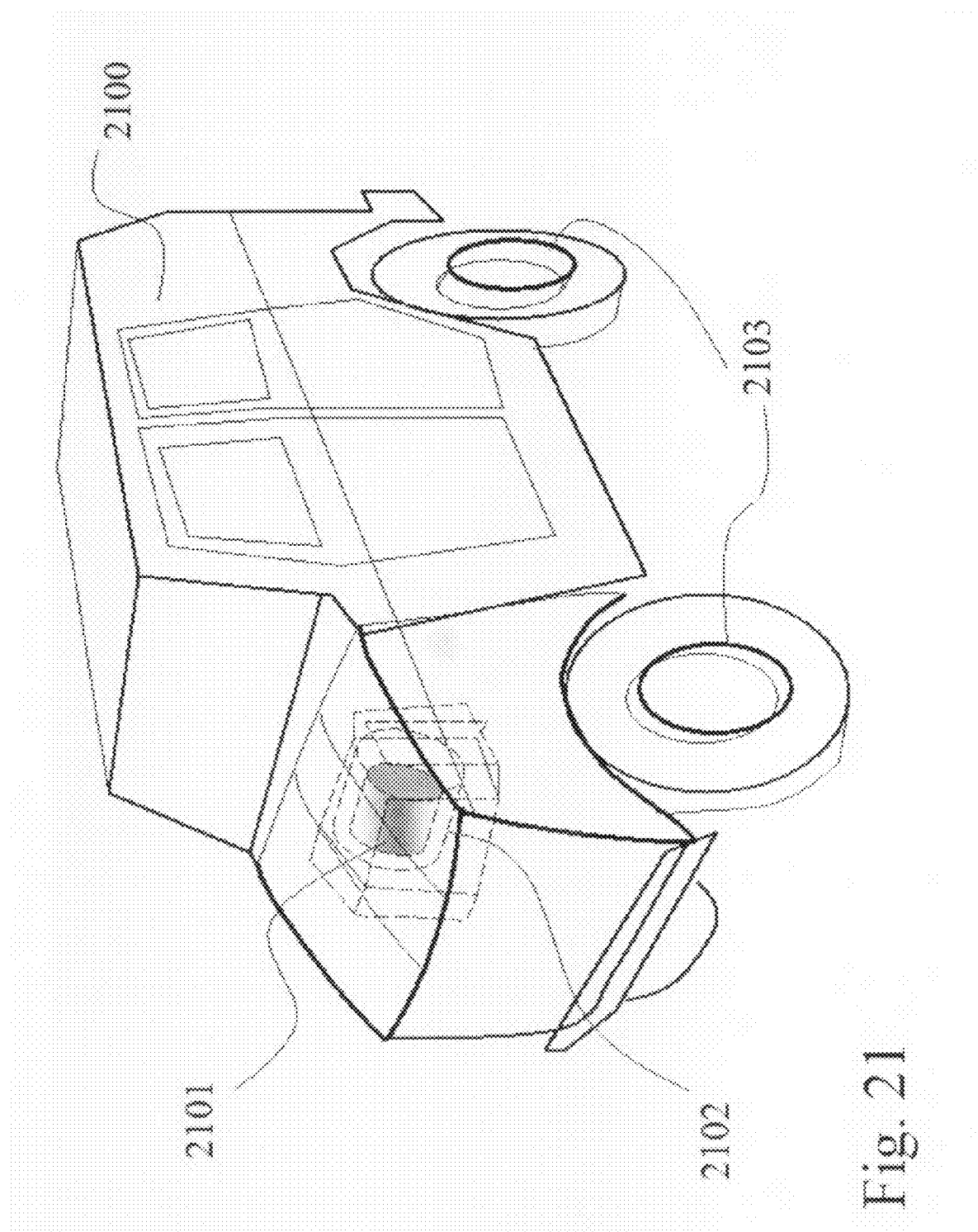

NANO-STRUCTURED NUCLEAR RADIATION SHIELDING

CROSS REFERENCE TO RELATED APPLICATIONS

This application claims the benefit of U.S. Provisional Application No. 60/934,412 filed on Jun. 13, 2007, which is hereby incorporated by reference in this entity.

BACKGROUND

1. Field of the Invention

The invention refers to structured materials used to trap and guide inside nuclear radiation or particles such as X- and gamma-rays, neutrons, charged particles, and their potential applications in nuclear power, imaging and shielding.

2. Description of the Related Art

Channeling experiments proved that radiation may be trapped inside atomic lattices and steered in a similar manner with that the microwave and optical radiation is driven through wave-guides and, respectively, optical fiber. Charged particles and X-ray channeling has already reached the applications stage in accelerator and space technology.

The new development based on nano-structures pushes the limits of channeling towards the high-energy radiation domain.

The present solution of using complex nano-structures that can be electrically controlled opens the way to a new revolution in nuclear energy.

SUMMARY

A novel material that is able to trap and guide nuclear radiation in a controlled manner. The material is made of a plurality of controlled grown nano-structures, able to guide and gyrate the radiation along the structure at desired angle. The material may be built in hetero-structures inserting electric sensitive materials that make its channeling properties change with the applied voltage.
A device made using such material that controls the radiation direction is possible of being used as control device in nuclear reactor replacing the existing control rods.

BRIEF DESCRIPTION OF THE DRAWINGS

FIG. 20—A mobile miniaturized nuclear reactor structure including three layers of radiation control and deflection.

FIG. 21—Mobile nuclear powered SUV made with the radiation direction control; layers.

DETAILED DESCRIPTION

Figure 1:
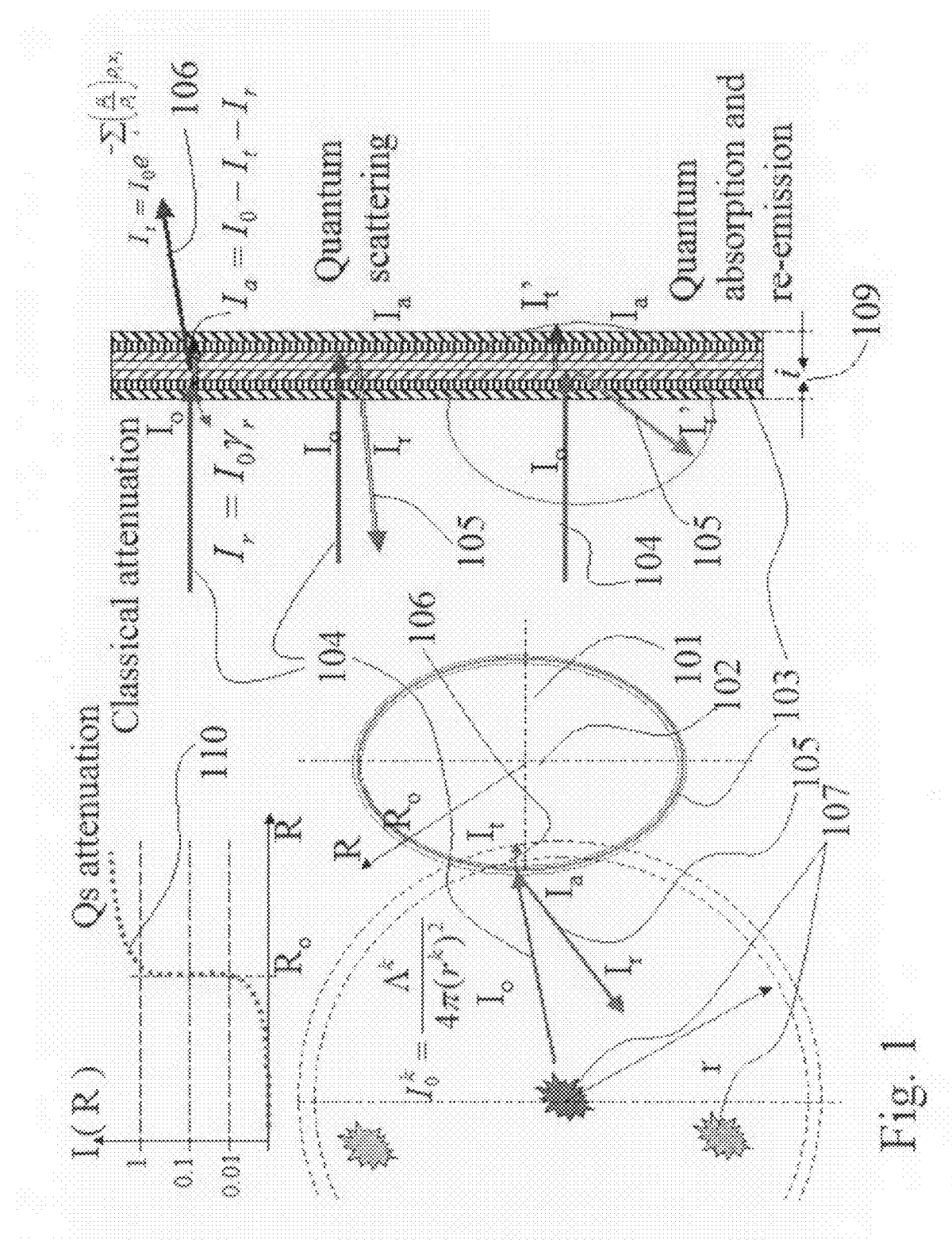
FIG. 1—The three processes that may be used for radiation shielding.

FIG. 1—Shows three possibilities to make radiation shielding based on classical and non-classical approaches. The radiation sources 107 are supposed to emit radiation in space having a spherical symmetry, with the intensity at a distance r from the source given by the formula pictured in the figure above the source 107, where A is the source's activity for a particular radiation k. $I_0^k$ is the particular radiation intensity of the radioactive source "k" placed in position "0"—the origin of the coordinate system, that hits a shielding element on the external surface placed at a distance "$r^k$" from the radioactive source k. The ray 104 represents the path and the radiation Pointing vector that is hitting the shield and has the intensity on its surface $I_0^k$. The shield 103 has its thickness made of a plurality of elemental layers "i" 109 protecting a volume content 101 and has an associated coordinates system 102.

At the contact with the surface 103 the incident radiation 104 is reflected 105 and refracted 106. The ratio $I_r$ 105 to $I_o$ 104 gives the reflection coefficient, also called "albedo", while the ratio $I_t$ 106 to $I_0$ 104 gives the transmittsion coefficient. In current nuclear radiation calculations $I_t$ is assumed equal with $I_0$ because the reflection factor is smaller than 2% and is depending on incidence angle and energy. The classical absorption theory based on random interaction is following the exponential law having the absorption coefficient depending on material, density and radiation energy as showed by the formula pictured in the uppr left corner near the arrow labeled 106. The absorption length is defined as being the length where $I_t$ becomes 1/e from $I_o$ or when the summation at the exponent of the absorption factors equals 1.

There is important to understand that the absorbed radiation does not disappear, it is considered absorbed because it disappears from its original group "k" but the absorption location becomes a source reemitting the absorbed energies in other forms depending on the mechanism of interaction.

The generic term of quantum scattering is covering the Thompson and Compton scattering as well the nuclear absorption and reemission also called non-elastic scattering, or resonant absorption and reemission of radiation.

The quantum absorption, often called resonant absorption is based on the nuclear resonance mechanism where the radiation is exciting the inner energy levels of the nucleus or atom, saying that it excites the absorption element that further decays emitting the energy in various, other specific forms, becoming a secondary radiation source. In this moment the radiation associated particle say the gamma photon of energy $E^k$ belonging to the specific group k disappears and other radiations k' appears originating in that new place.

The curve 110 shows the desired attenuation shape in the system of coordinates 102 of the shielded body 101 that relies on some path attenuation of the incident radiation 104, a high attenuation at the interaction with the shielding 103 that reduces the transmitted radiation 106 that further attenuates along the path inside the shielded volume 101. Drastic reduction of the transmitted radiation 106 at the incidence with the shielding material based on high reflection 105 due to a high reflection coefficient or "albedo" is impossible to be reached in usual cases for X, or gamma rays and neutrons due to their particularities of interaction with matter. The multi-layer shielding 103 made of individual successive material layers "i" 109 is showing the actual approach in radiation shielding, that has the disadvantage of low absorption factor that requires important material thickness and weight.

Figure 2:
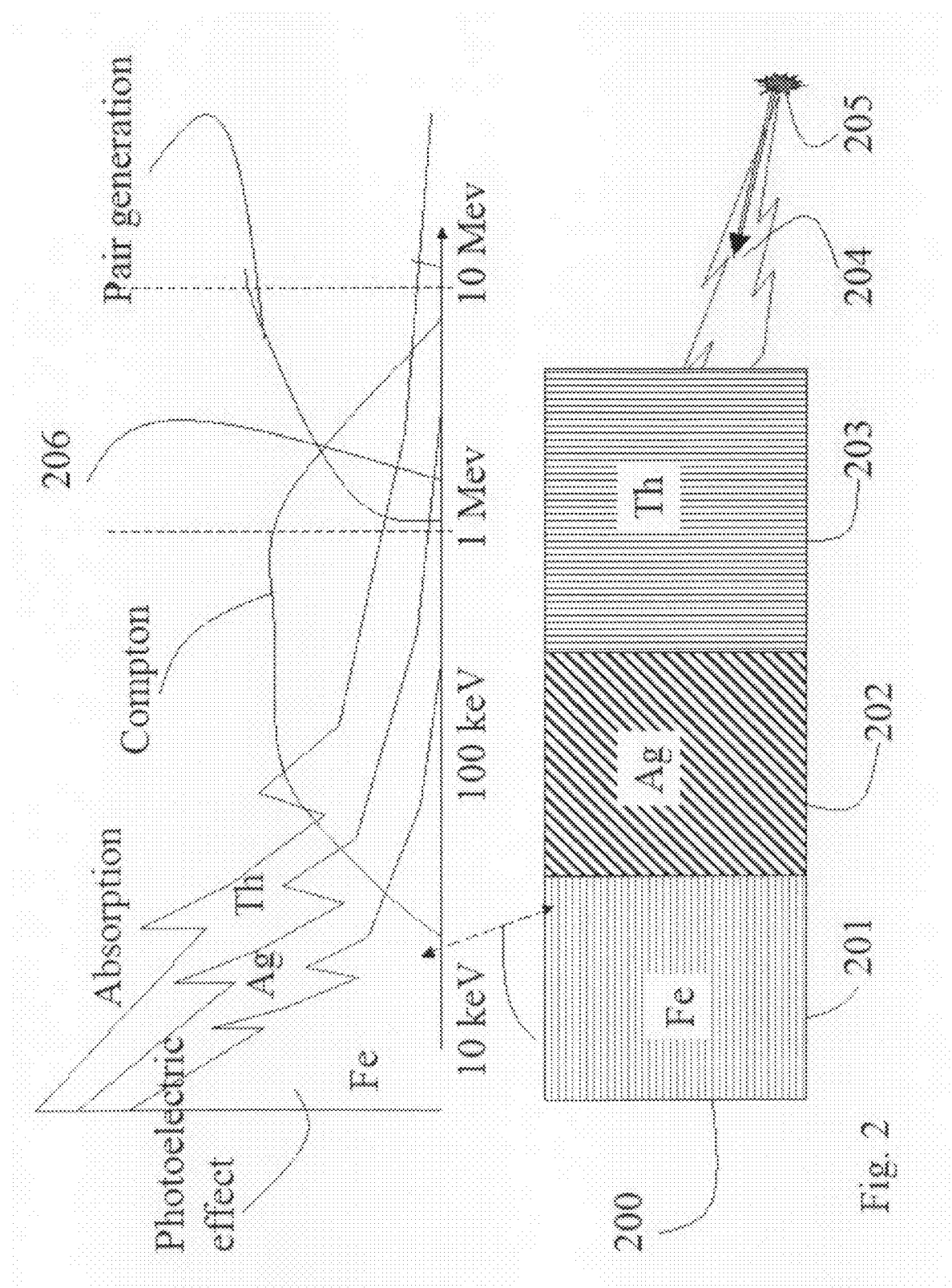
FIG. 2—The photon interaction with matter processes that may be used in a three-layer structure for radiation degradation and absorption.

FIG. 2—Shows the gamma radiation "degradation" (radiation energy gradual reduction) and absorption mechanism used in the actual best radiation shielding. The shielding 200 has a structure arbitrarily taken for exemplification purpose. The present shield is made of an inner layer of iron "Fe" 201, covered outside (shielded) by a layer of silver "Ag" 202 that is shielded at exterior by a layer of thorium "Th"203. As the chart 206 shows thorium having the biggest electronic density and mass density exhibits the biggest absorption coefficient for the supposed gamma radiation 204 generated by a radioactive source 205.

If the gamma or X bremsstrahlung radiation energy is greater than 1.022 MeV the interaction process is dominated by the pair generation as shown in the plot 206 that has the vertical scale (ordinate) in relative units. The pair electron-positron shares the difference of energy ($E_{rad}$–1022 keV) as kinetic energy. Both are stopping in the shielding matter by generating showers of knock-on electrons that generate X rays. When the positron energy becomes small enough it annihilates with a lattice electron reemitting the mass energy of 1022 KeV plus a share of the electron chemical bounding energy by two photons of a little bit more than 511 KeV.

These photons released at near 180 deg. creates new gamma rays source localized somewhere in the Thorium 203 bulk. Another effect according to the plot 206 is the Compton effect. This effect is based on the collision between a photon with an electron that generates a recoiled electron and a lower energy photon. The recoiled electron is stopped in the lattice generating showers of knock-on electrons with associated X rays, while the lower energy photon in similar with a new source of radiation appeared somewhere inside the shielding, with some angular distribution, given by the Compton effect particularities.

This is the mechanism that transforms a mono-energetic radiation into a plurality of radiations covering a large energy spectrum but with maximum energy lower than the energy of the initial radiation, conserving the energy.

At lower energy materials start to exhibit specific absorption curves while at higher energies the mass density determines the absorption coefficient.

The reasons for this "energy degrading" material combination is that Thorium 203 with high density has high stopping power is very effective to stop most of the initial beam 204 with high energy producing its own high energy X rays (i.e. $^{232}$Th-$k_\alpha$, $k_\beta$, L ..., M ..., etc), Compton and annihilation rays (511 keV). These Thorium secondary generated photns with lower energies are stopped in silver 202, which at its turn, emits more lower energies that are applied to Iron 201. The iron still emits 5.6 keV as K-alpha specific X ray higher energy and series of specific L, M lines. Aluminum—plastic linear may take out these lines leaving lines only lower than 1 keV and part of the entire attenuated spectrum. This means that each mono-energetic gamma ray is replaced after passing through the shielding with a continuum spectrum overlapped on a spectrum of characteristic lines of the elements it passed through, all at lower intensities. This kind of shielding leads to centimeters of material thickness and specific weight in tones.

Figure 3:
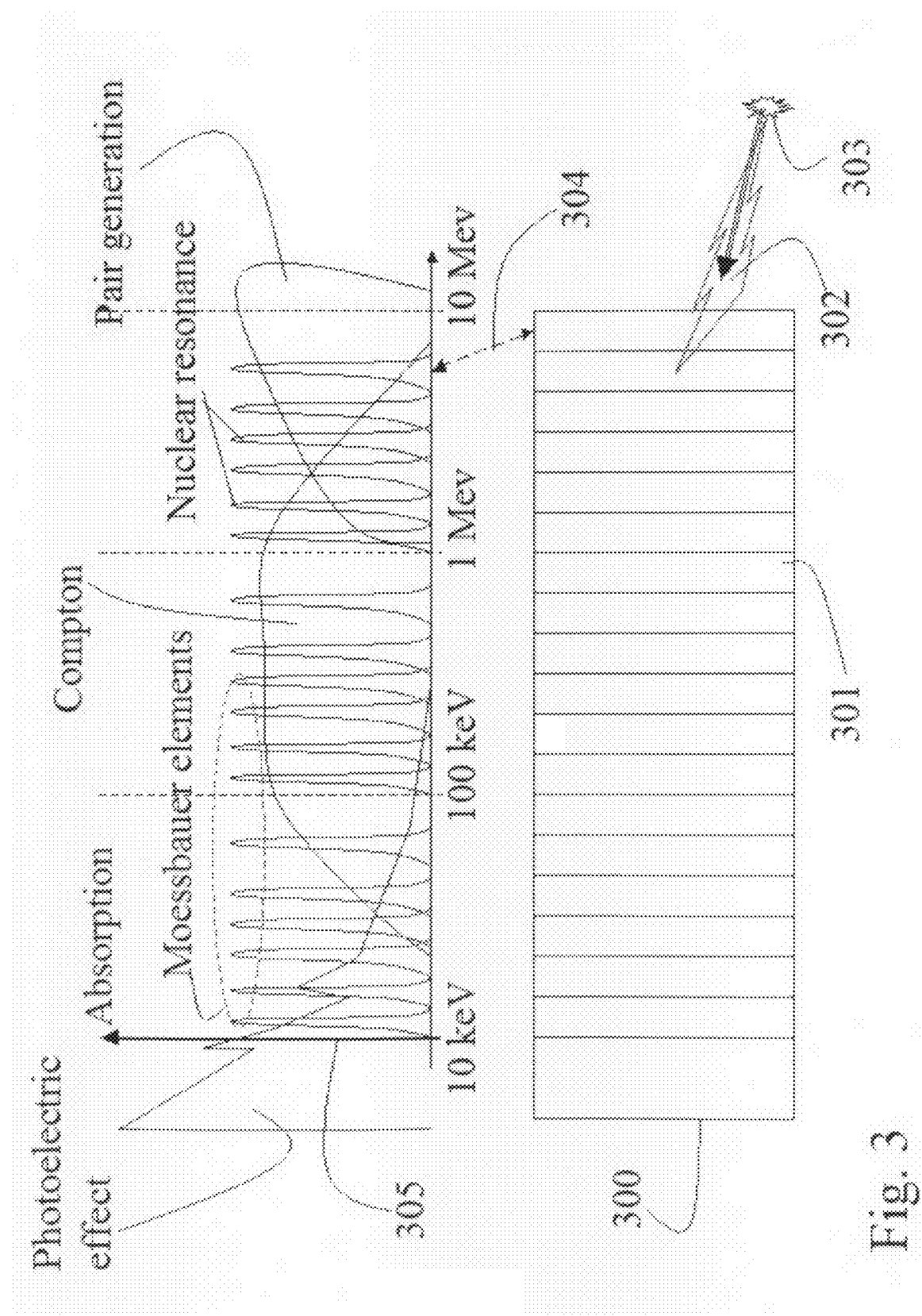
FIG. 3—The main interaction mechanisms between gamma and X ray photons in a multilayer multi-material energy resonant structure that makes resonant absorption and scattering of radiation to obtain the attenuation effect.

FIG. 3—Shows a procedure to enhance the attenuation coefficient by using a multi-layer resonant absorption attenuation arranged in an energy decreasing order as an embodiment of the present invention. As was mentioned in the explanations for FIG. 2, the attenuation coefficient of materials for photon radiation with energy over 500 keV is practically the same for about the same mass and only the density makes a difference in shielding thickness. To obtain a high attenuation requires excessive weight that impairs the applications. For neutrons, the shielding problem turns out to be more difficult, requiring several feet of absorbent materials around the radioactive source.

Keeping in mind the Moessbauer effect and the most used elements in these experiments, there is possible that under the thorium outer layer in FIG. 2, 203 to introduce a plurality of Mossbauer elements layers, few mm thick each, with the resonant energy decreasing along the path like an "energy cascade". These elements, generically called "Moessbauer elements" will enhance the overall absorption cross-section by the addition of the nuclear resonance that has as final effect an increase in scattering because a resonant photon absorption is followed by its reemission. In FIG. 3 the entire shield 300 is made from nuclear resonant layers arranged in the order of increasing the nuclear resonant energy towards the radioactive source 303 that produces the irradiation beam 302. The line 304 shows the assignment of the nuclear resonance energy in the plot 305 to a shield layer 301.

The comb-looking nuclear resonances are coming to enhance the absorption cross-section of the multi-material shielding 300, finally reducing its thickness and weight.

The theoretical predictions show a mass reduction of more than 50% from the initial shielding 200 in FIG. 2 to the new shielding 300 in FIG. 3, but this is not enough for many applications. In conclusion, by introducing centers of absorption and reemission of the radiation more than 50% of the incident radiation is backscattered and more than 80% or the radiation power may be taken by the shield.

Figure 4:
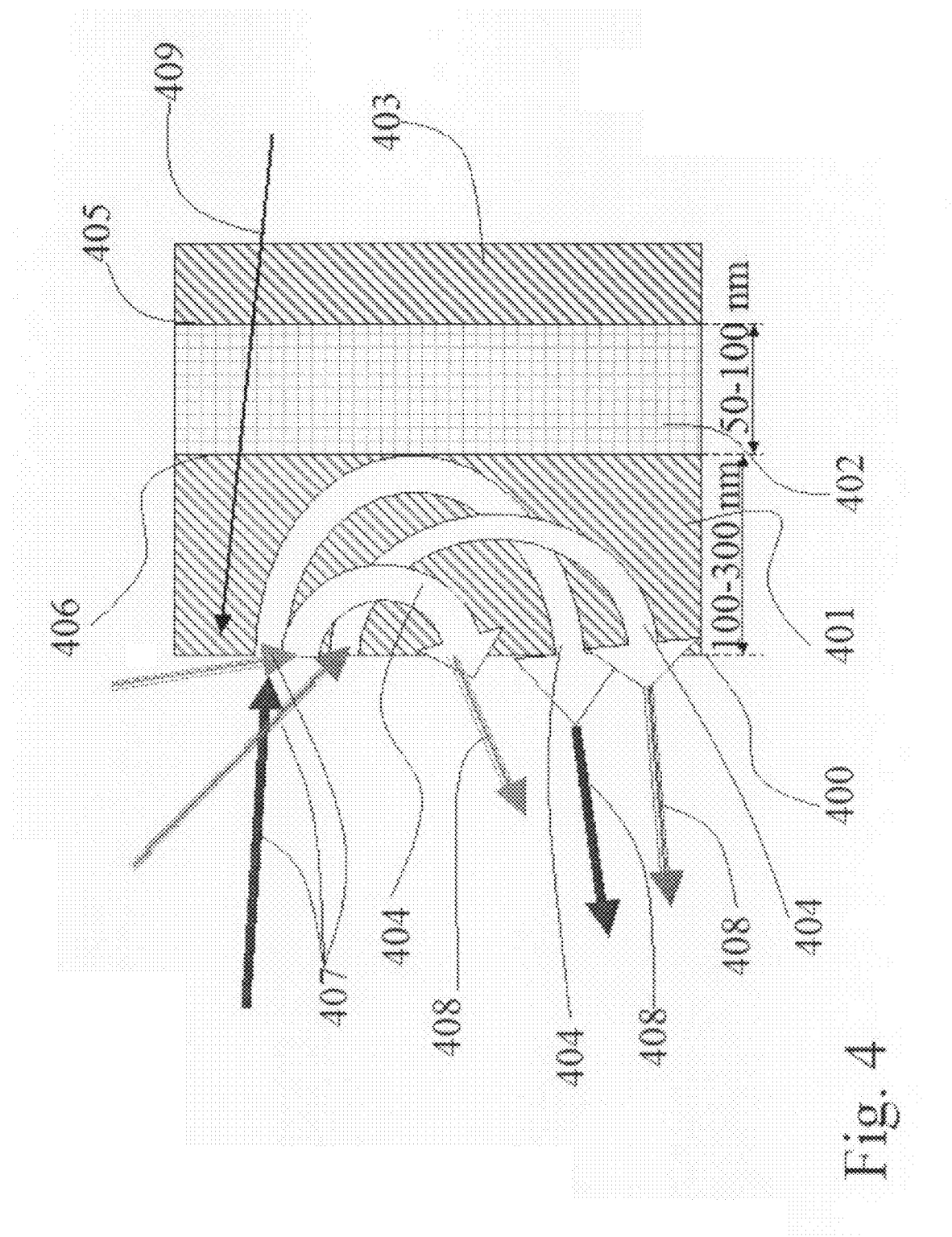
FIG. 4—The radiation "gyration" scheme obtained by guiding the trapped nuclear particles in ben[t] nano-fibers.

FIG. 4—Shows a main embodiment of the invention represented by the radiation "gyration" (term borrowed from microwave technology) schematic diagram obtained in bended nano-fibers acting like microwave-guides. The main idea developed in the patent is similar to the concept of radiation channeling in crystals. This concept is proven and in current use for charged particles and neutrons. More using elastic crystals there is possible to easy bend the beams of particles and neutrons similar to what happens to light in the optic-fibers.

The development of nano-technologies offered the possibility to push the particle associated wave frequencies even higher.

The radiation shielding is efficient when it denies the radiation access in the protected volume without the shield being damaged in time by radiation-combined effects of power deposition. The shield 400 is made by a few hundreds nm thick channeling layer 400 separated by the interface 406 from a high radiation absorption layer 402 stuck through the interface 405 to the backing layer 403.

The incident radiation 407 is hitting the layer 401 in the input space of the nano-channels 404 acting as a resonator, that allows radiation to enter at various angles and drives it along the nanochannel 404 out of the structure 408 "bending" (term used in particle accelerator beam transport) it at various angles between 90-180 deg.

The guiding structure 401, 404 is not interfering with the radiation coming from the opposite direction 409.

The intermediary layer 402 separated by the interfaces 405 and 406 is used to apply electric current in order to switch or modify the reflection properties of the structure 401, making control a possibility.

Figure 5:
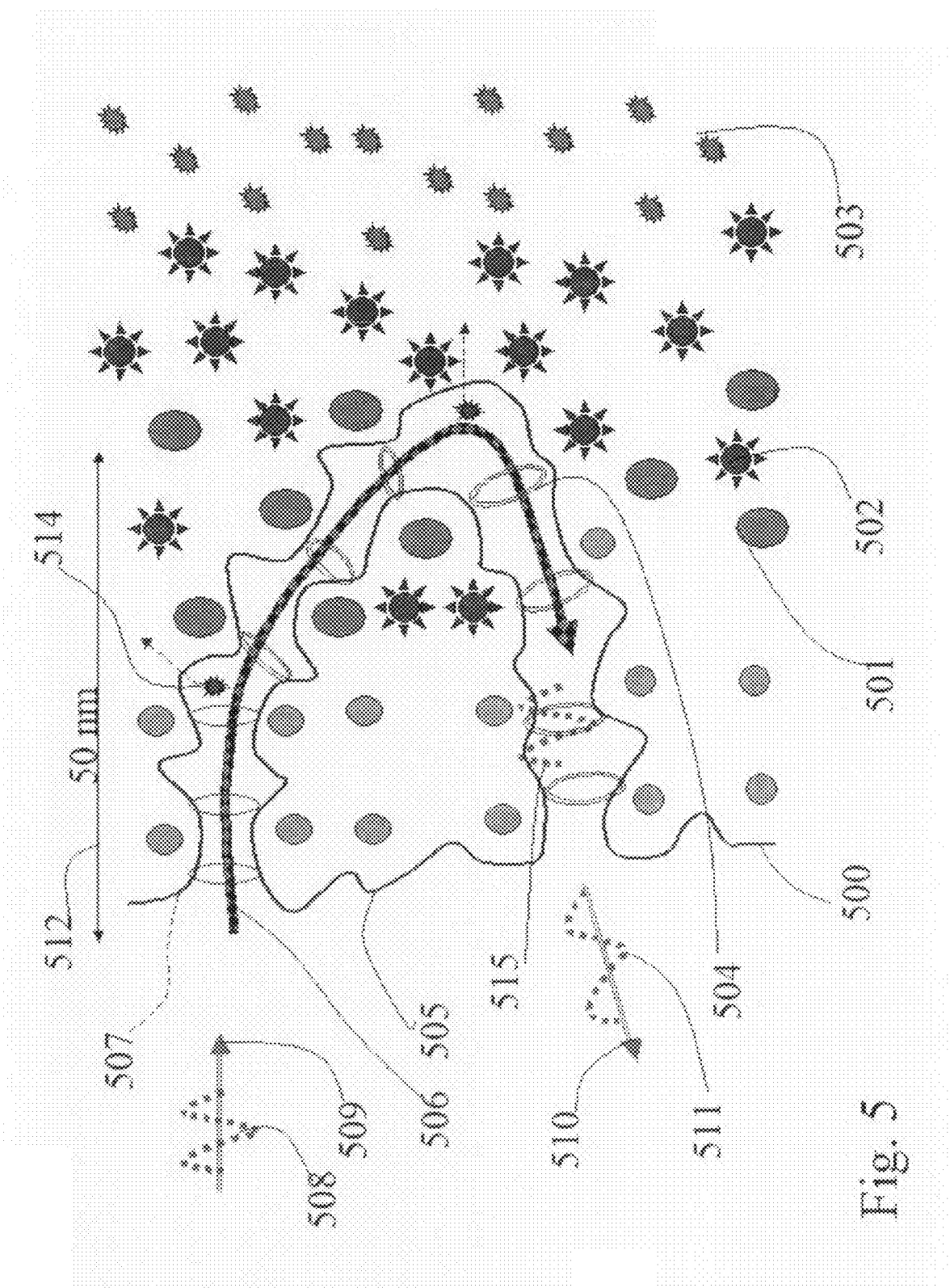
FIG. 5—The schematic view of a molecular-nanoguide of nuclear radiation associated wave made in multi-layered material that guides the radiation and use electro-sensitive quantum scattering centers to divert the radiation and control its transmission along the nano-guide.

FIG. 5—Shows a main embodiment of the invention presenting the way a bent molecular wave-guide is made by using multi-layered clustered material. The high reflection material is made of several layers of molecular clusters. The input layer 500 is creating a rarefied electronic structure based on fullerenes or metallic spheres, able to create a resonance cavity to trap radiation inside, in the wave guide made by the molecular orbital 505. The incident wave 508, having the Poynting vector 509 towards the material, is reaching an input structure 505, 507 that guides it inside on a resonant path 506. The changes of the molecular distribution from the material 500 to 501 and 502 makes the molecular wave-guide turn, driving the wave back outside by slight interaction with electronic charges 514, and being resonantly trapped into the middle of the wave guide isopotential made of the electronic orbital surfaces 504.

The material 501 is implanted over the interface 500-502 modifying the cluster end in order to make the wave-guide bend driving the wave or particle trapped inside 515 towards outside 511 but traveling in opposite direction 510. The material 502 is deposited on a structural resistance material 503 that may be a polymer, fabric or metal-ceramic sheet.

The total depth of the channels remains small in the domain of 50 nm to several hundred nanometers making that the total impulse transfer due to radiation direction change by multiple small grazing angle interaction to be taken by several thousands atomic structures making the total energy taken from the radiation to be small.

The slight interaction with the electronic structures and hard interaction with the nuclear structures keeps the wave on track changing the direction in small steps. The generation along the channel of orbital magnetic moments is welcomed for neutrons "gyration", creating a focusing-defocusing molecular structure similar to particle accelerators. The resonance between neutron spin, turning and the magnetic orbital moment alternation is generating the steering force. For practical reasons, a 90 deg. gyration seems enough to comply with most of the shielding purposes.

For nuclear reactor control purposes up to 180 deg. gyration angle seems appropriate to keep the radiation in a specific zone.

Figure 6:
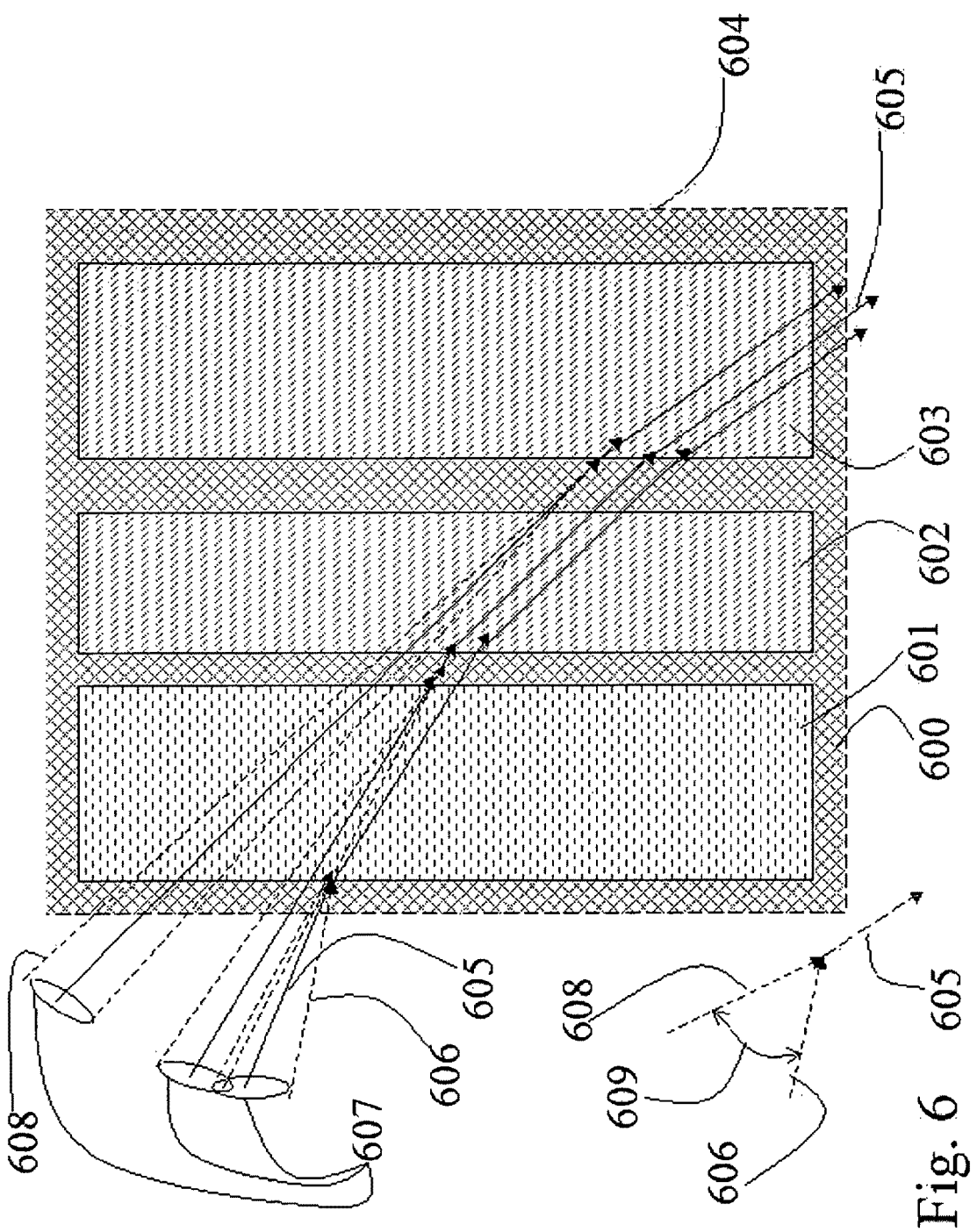
FIG. 6—The radiation funneling scheme using partial gyration in segmented radiation channels to increase the nuclear radiation trapping solid angle.

FIG. 6—shows another practical approach of the radiation funneling mechanism by channeling into molecular wave-guides and turning it little by little. The higher input acceptance solid angle is used to trap particles inside the nano-channel and to release them through a termination with unidirectional escape angle from the channel, which will improve the previous structure input radiation admittance angle.

The radiation 605 having a broad energy spectrum enters in the reflective solid 600 at a certain incidence angle and acceptable input distribution solid angle 607, accepted for channeling in the first layer 601. This layer turns the radiation a little bit and delivers it at an angle, matching the next layer 602 admission criteria. The incident radiation coming in the 602 layer acceptable angle is off the acceptance angle and did not interact by channeling with the upper layer 601, and instead adds in the 602-layer entry level with 601-output radiation.

The second layer's 602 output is cumulating with the radiation coming directly inside the admission cone up to the angle limit 608 and is channeled to the nano-structure output. This way, the radiation incident on the material's surface between angles 606 and 608 forming the angular acceptance 609 is delivered inside the narrow exit angle 605. The material may be continued with several other layers in the direction 604 such as a Pi (180 deg.) incidence angle to be diverted in a single direction.

Figure 7:
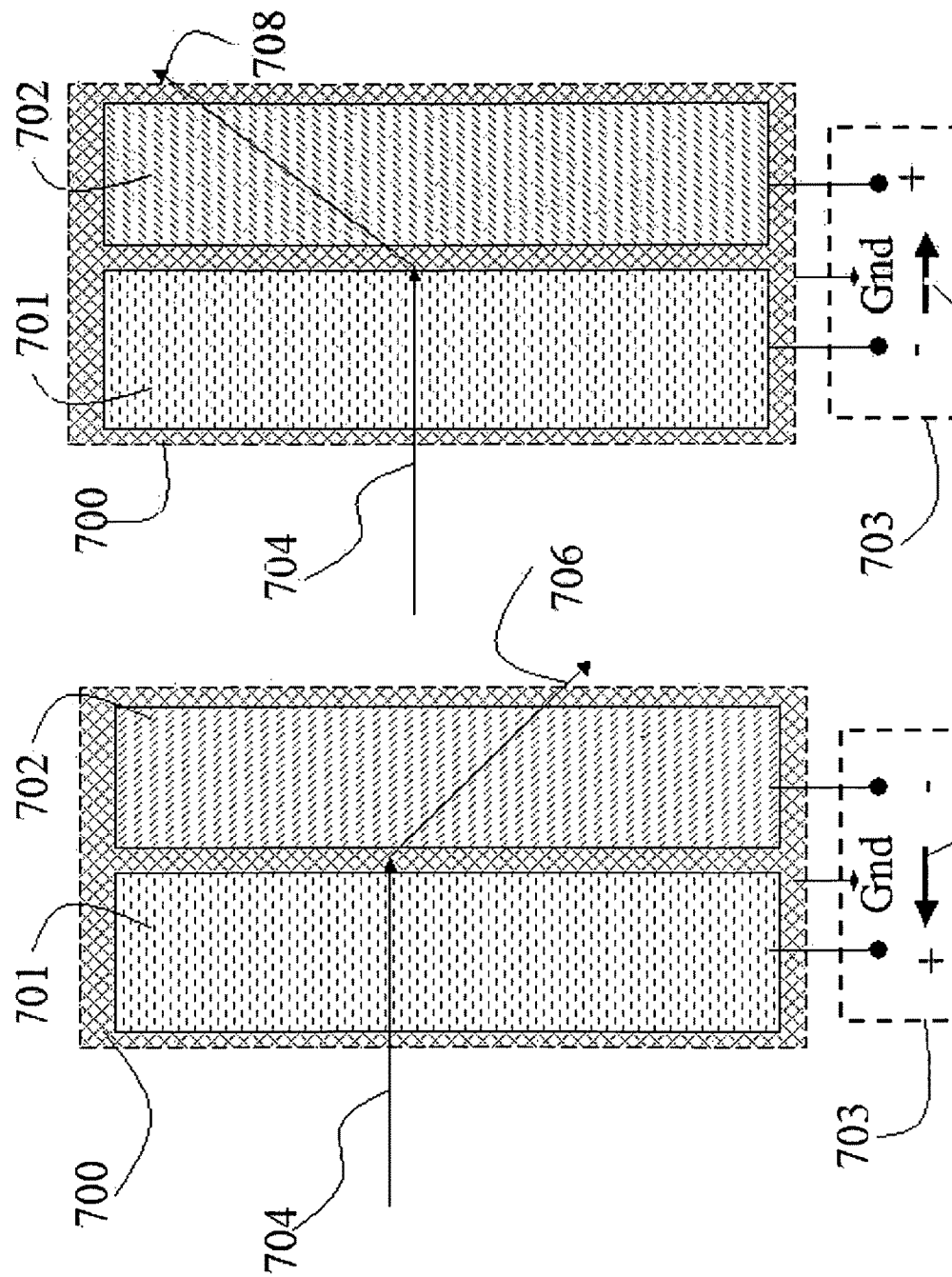
FIG. 7—The principle of the X, gamma and neutrons radiation electronic switch.

FIG. 7 shows another embodiment of the invention that makes the X gamma and neutrons radiation switch from a direction to another by using a combination of ferro-electric and piezo-electric clustered materials. This is important because it introduces the capability of applying an electronic control over the direction the radiation is driven. The application of the voltage on the active layer modifies the structure and orientation of the molecular wave-guides due to electrical anisotropy of the piezo and ferro electric clusters. The simplest device is a lamellar bi-material with the piezo-electric material being deposited as a layer on the channeling material shrinking or expanding according to the control voltage.

The device in FIG. 7 performs inner-intra-molecular changes at the cluster level driven by the external voltage. The nano-material is formed from the substrate 700 and the active layers 701 and 702. When the voltage is applied in one direction 705 in the adaptor module 703 the incident radiation 704 is deflected in the direction 706, shown in FIG. 7A. When the applied voltage is modified or reversed as 707 shows the incident radiation will be deflected in direction 708 as showed in FIG. 7B.

The advantage is that radiation direction may be controllable being possible of making a electrically-controlled radiation shutter.

Figure 8:
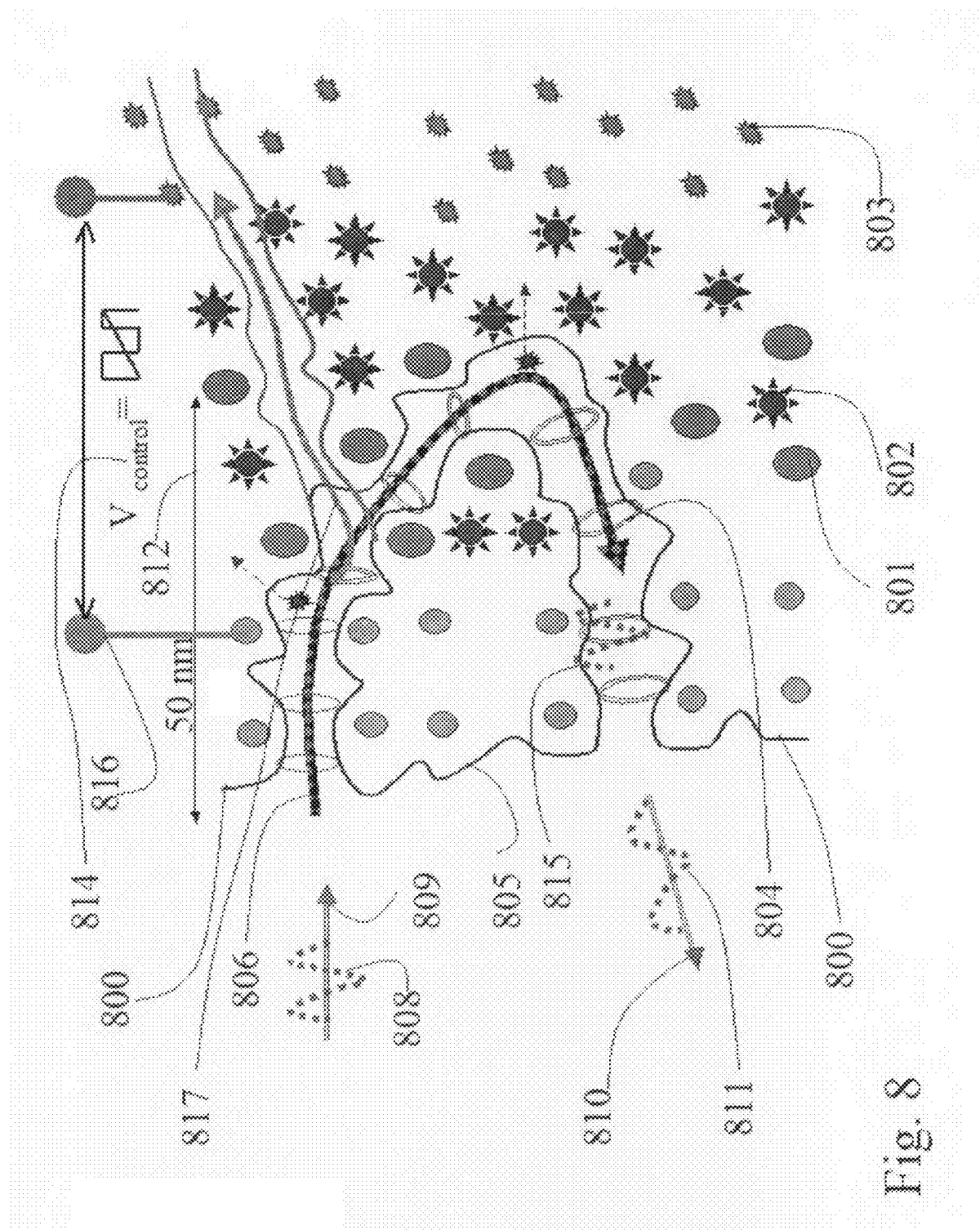
FIG. 8—The schematics of a "miu" radiation switch with digital commutation electronic control.

FIG. 8—shows a main embodiment of the present invention called the "miu" radiation switch made of a radiation gyrator, based on a bended molecular wave-guides whose transmission is perturbed by an electrosensitive implant material controlled electronically.

The material is in a planar micrometric construction having conductive layers 816 that can be used to apply the voltage 814 to control the inner channel gate mechanism. The input layer 800 is creating a rarefied electronic structure based on fullerenes or metallic spheres, able to create a resonance cavity to trap radiation inside, in the wave guide made by the molecular orbitals 805. The incident wave 808 having the direction (Poynting vector) 809 towards the material is reaching an input structure 805, 800 that guides it inside on a resonant path 806. The changes of the molecular distribution from the material 800 to 801 and 802 makes the molecular wave-guide turn driving the wave back outside by slight interaction with electronic charges, and being resonantly trapped into the middle of the wave guide iso-potential electronic orbital surfaces 804.

The material 801 is implanted over the interface 800-802 modifying the cluster end in order to control the bending of the "waveguide" that is driving the wave (particle) 808 inside and turns it 815 as is going towards outside position 811 and finally traveling in opposite direction 810. The material 802 is deposited on a structural resistance material 803 that may be a polymer, fabric or metal-ceramic sheet.

The total depth of the channels remains small in the domain of 50 nm to several hundred nanometers making that the total impulse transfer due to radiation direction change to be taken by several thousands atomic structures while the total energy taken from the radiation is small.

The weak interaction with the electronic structures and strong interaction with the nuclear structures keeps the wave on track changing the direction in small steps. The forming along the guiding channel of orbital magnetic moments is welcomed for neutrons gyration creating a focusing defocusing molecular structure similar to those "FODO" structures used in particle accelerators storage rings. The resonance between neutron spin turning and the alternating magnetic orbital moment is generating a turning force. For practical reasons a 90 deg. gyration seems enough for most of the shielding purposes.

For nuclear reactors control purposes a gyration angle up to 180 deg. seems appropriate to keep the radiation in a specific zone. The application of the voltage over the piezoelectric or ferroelectric structure makes the switch of the channels from that turning around 806 to that making a forward transfer 817 allowing the radiation to pass through without attenuation. The control voltage 814 may be applied in digital or analog manner.

Figure 9:
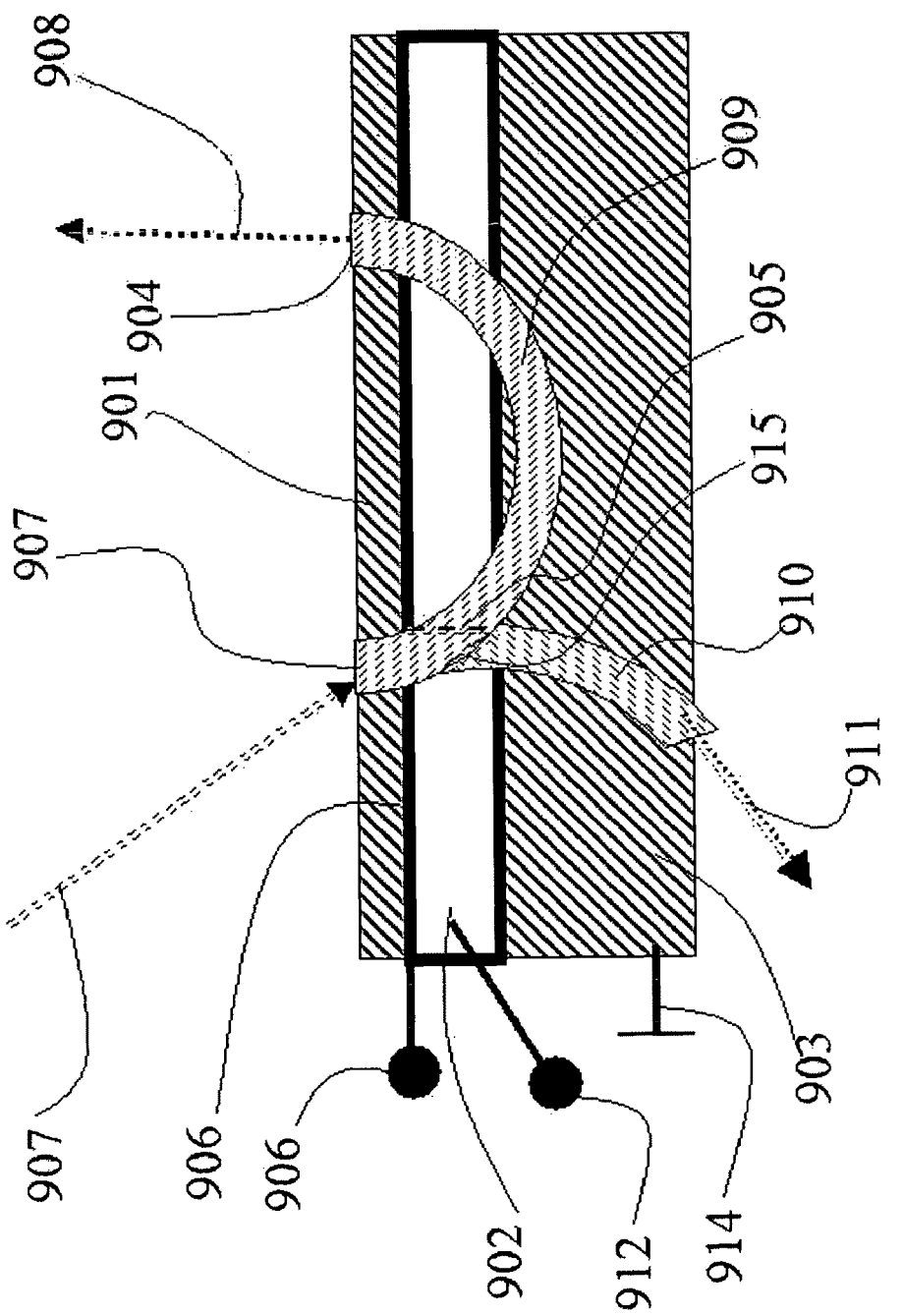
FIG. 9—The schematic diagram of a monolayer "miu" switch using an electro-sensitive inserted layer.

FIG. 9—shows a single layer of "miu" switch schematics in order to clarify its operation mode. The material is at the minimal approximation tri-layered. The intermediary layer 902 facilitation the switch 905 to 915 operation and it is separated from the input layer 901 by a conductive interface 906 that is applying the voltage between 901 and 902 layers relative to the backing layer 903 grounded by the plot 914. The voltage applied on 902 layer by the plot 912 induces a displacement in the switching structure 905, 915 such that all the parallel channels initially opened to "gyration" on the path 909 are moving to narrow the "gyration channel" while opening the direct pass channel 910. The radiation, such as gamma, neutron, X, that is coming from the 907 direction is entering the admittance resonant chamber 907 and is going to have a complete gyration along 908 direction to 904 exit chamber. When the voltage between 906, 912 plots is modified with reference to 914 the particle goes into the transmission channel 910 exiting in forward direction through 911. This represents the development of a voltage controlled variable "albedo", shielding reflector.

Figure 10:
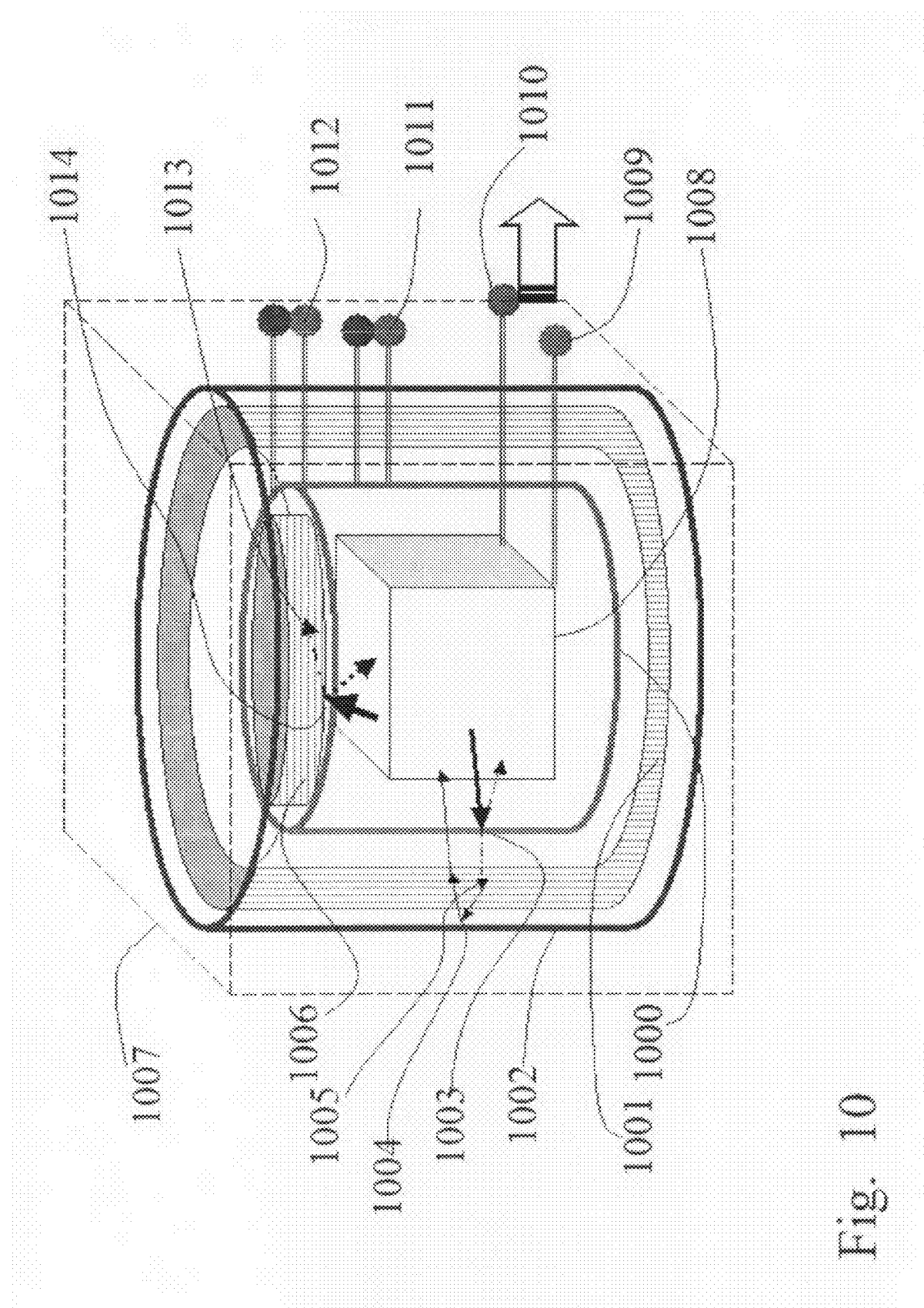
FIG. 10—The neutron flux control in a nuclear reactor using variable transmission "miu" switch shielding layers to make a controlled "reflectivity" inner coat and a radiation total reflection external coat.

FIG. 10—shows the voltage-controlled reflectors, an embodiment of the present invention, application in the nuclear reactor 1008 control and shielding 1002 using the "miu" switch variable transmission 1000 and, respectively, a passive "gyrator" structure 1002. This is an important stage of the invention as allows for the drastic reduction of the shielding dimensions and mass.

The nuclear reactor structure 1008 is operating using a direct nuclear energy conversion into electricity module 1008 delivering directly the electric power at the plots 1009, 1010 and using a thermal conductivity heat extraction for which the plots 1009 and 1010 represents the cooling agent exit and input in the reactor critical volume. The criticality is controlled by adjusting the neutrons transmission through the nano-shielding 1000 such as to maintain the required power level. When the nuclear reactor 1000 power has to be decreased the transmission through the shield 1000 is increased. The released neutrons are used for the fuel breeding in the blanket 1001 or fission products burning in the blanket 1006. The control shielding may have many plots to control the shielding 1011 at the local or sector level, adjusting the number of neutrons that are escaping in the outer layer blanket 1001, and separately other control plots 1012 to adjust the neutron escape flux in the top blanket 1006. The escape neutrons from the reactor's core are hitting the active shielding 1000 in the point 1003 and depending on the applied voltage applied on the plots 1011 the neutrons can reflect back in the reactor or may pass through and interact with the breeding fuel 1001 being absorbed in the point 1005 or being scattered, hitting further the nuclear reactor external shield in the position 1004 where they are reflecting back. The outer shield 1002 may be funneled by placing them tangent to breeding structure or being allowed to go along a radial path back inside the nuclear reactor 1008. In the upper side the escaped neutrons may reach the shielding 1000 in the point 1014 and, depending on the voltage applied on plots 1012, they may pass through and enter in the fission product transmutation blanket 1006 interacting in the point 1013, or may be reflected back towards the nuclear reactor core 1008. The entire structure is introduced in an external case 1007 with multiple functional roles.

These new materials and procedure represent an important advancement because it makes the nuclear power accessible on vehicles, and few MWDay structures may be produced in volumes as small as cubes of 2 feet lateral size, powering a house or residence for several years, or a car that may be driven several years between refueling.

Figure 11:
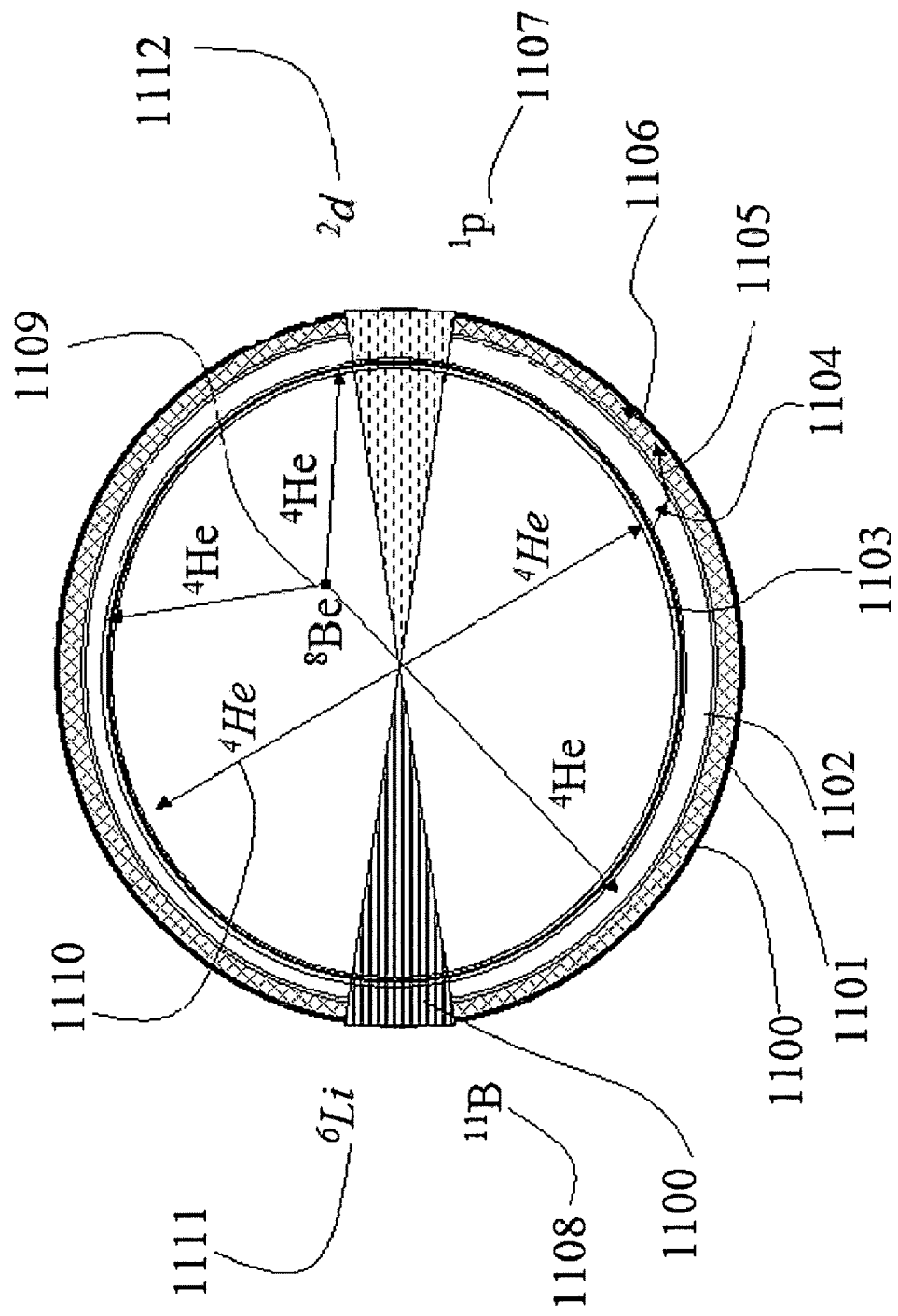
FIG. 11—The use of a radiation funneling shielding to shield a collider or plasma focused fission device.

FIG. 11—shows another application that uses a radiation funneling shielding device to shield a plasma focused fusion device being an embodiment of the present invention.

The figure shows an application related to collider fusion device based on two beams coming from opposite direction making the center of mass of the colliding particles be in repose relative to the center of the energy harvesting geometry.

The collider may be also made using a fixed perpendicular thin target and an energy harvesting structure placed after the target along the beam direction. In the figure, the role of the nano-shield 1102 is to funnel the fusion reaction secondary radiation (alpha, proton, neutron, electron) 1104 coming from the harvesting element 1103 such that to maximize its path in the absorbing element 1105 until it hits the outer nano-shielding 1101, which reflects it back tangentially 1106. The fusion assembly 1100 may have the fusion reactions of Boron 1108 with proton 1107, giving a Helium particle and a 8Be that instantly decays 1109 in two Helium particles, or Lithium 1111 with deuteron 1112 or proton, giving two Helium 1110 particles. The Helium particles carrying the fusion energy as kinetic energy interact with the direct conversion structure 1103 that takes their energy and transforms it into electricity.

Figure 12:
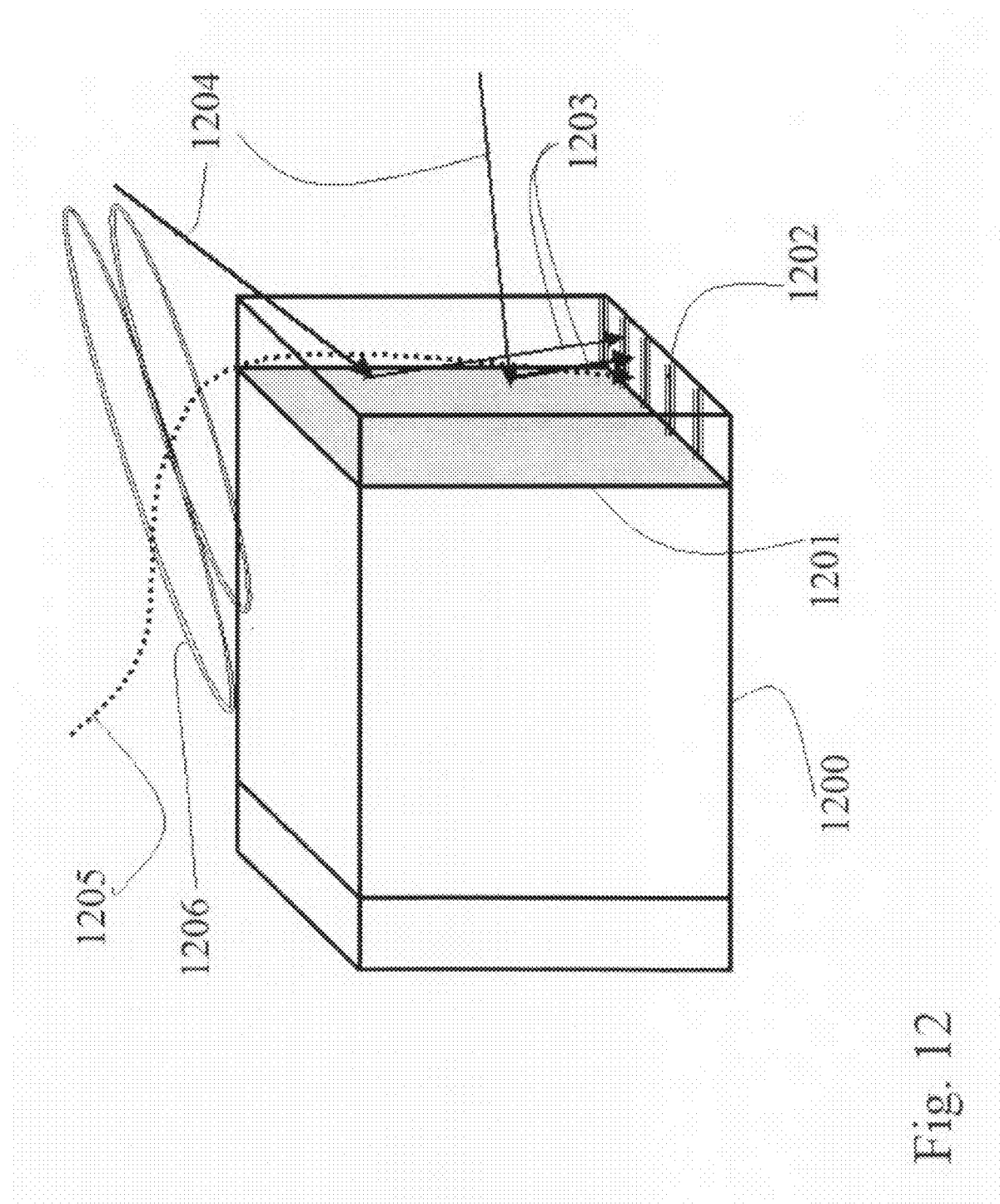
FIG. 12—A spacecraft radiation-focusing and shielding system for charged particles and X, gamma rays.

FIG. 12—shows another application as embodiment of the present invention; the application of the nano-layered funneling shield as a spacecraft radiation-shielding device for charged particles and X, gamma rays. In this case, the outer frame structure 1200 that protects the payload inside is shielded laterally by nano-foils 1201. This foil is funneling the radiation 1204 by controlled tunneling reflection 1203 to the energy harvesting elements 1202. For charged particles 1205, specialized inertial spinning magnetic coils 1206, are driving the charged particles into specialized or universal energy harvesting elements 1202. In this way a cosmic ray protection similar to the earth combined effect of magnetosphere and atmosphere may be achieved.

Figure 13:
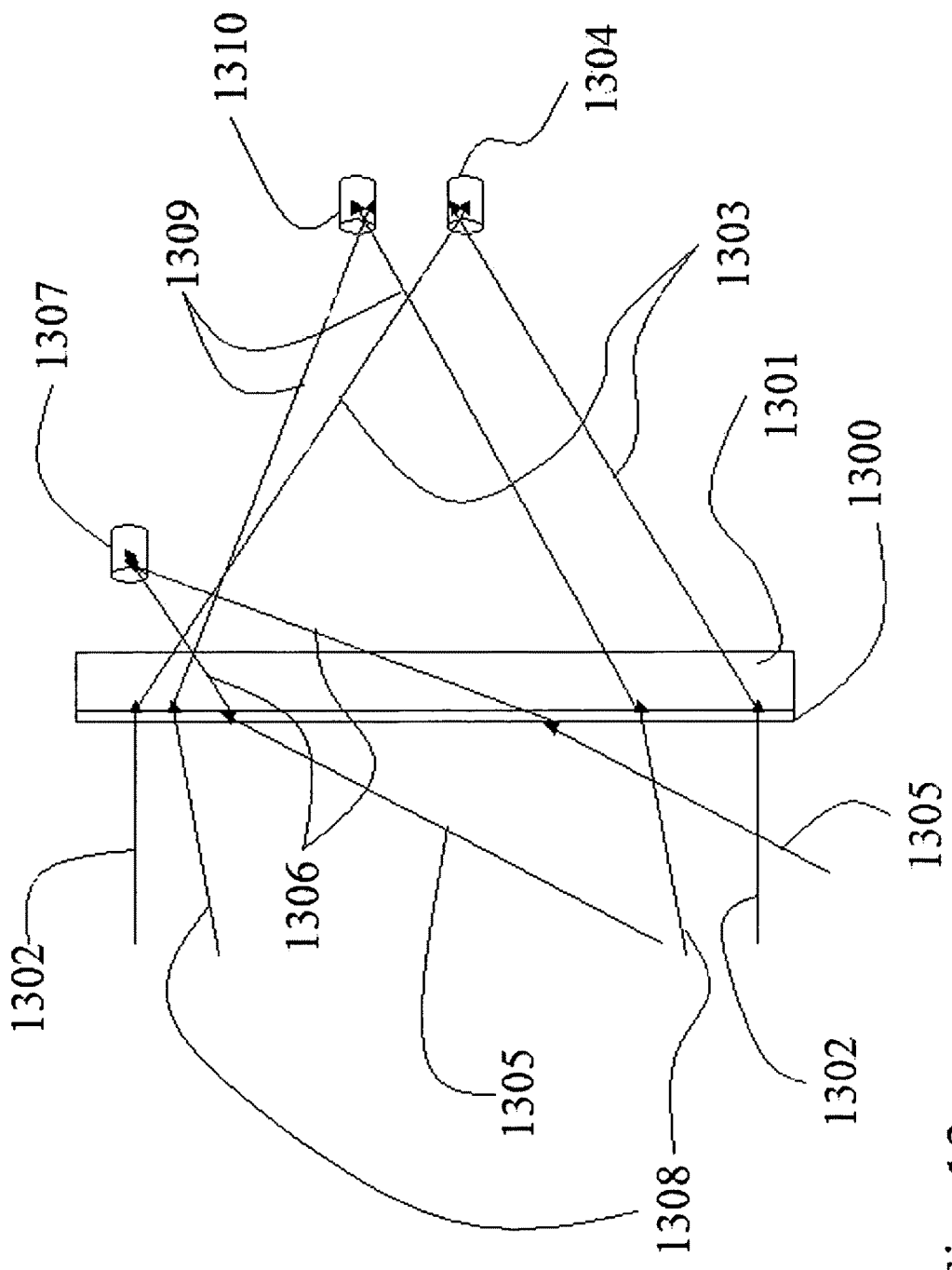
FIG. 13—A nuclear radiation optics element based on a multi-focusing multi-layered structure.

FIG. 13—shows another embodiment of the present invention that is a multi-focusing multi-layer device operating as gamma, X, n, charged particle imager. Various layers 1301 having narrow admittance angle and narrow directive output create the material 1300. A radiation wave coming from the direction 1302 is transmitted on the direction 1303 towards a point in space 1304 where a detector is placed. The same happens to radiation 1305, transmitted on the direction set 1306 towards the point 1307 with the appropriate detector is placed. The radiation 1308 is also transmitted on the directions set 1309 towards the point 1310 into the appropriate detector. The radiations 1302, 1305 and 1308 may be different and come under the same incidence angle, or may be the same, and the detectors may be different.

Figure 14:
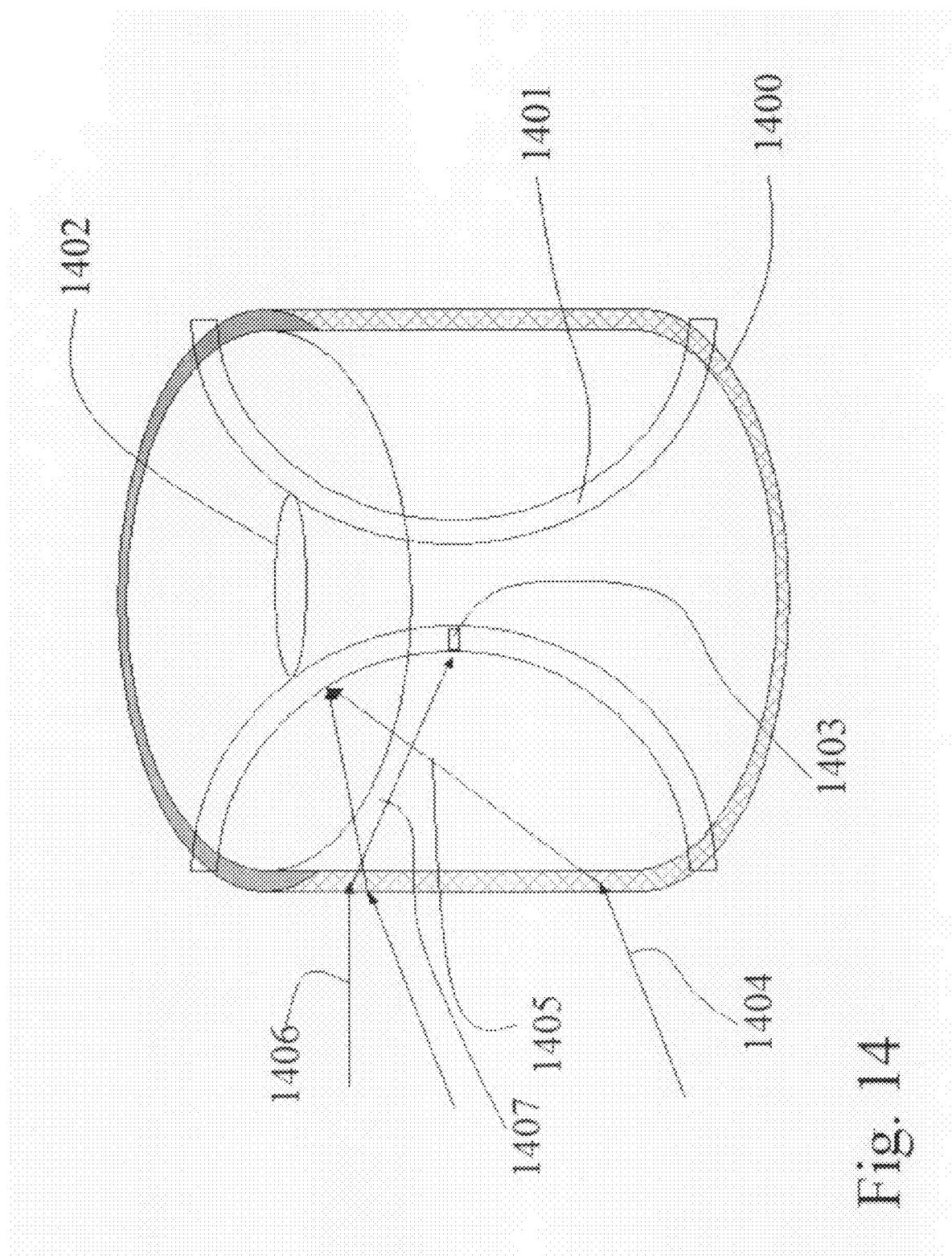
FIG. 14—The schematics of a radiation-imaging device with cylindrical symmetry for space applications.

FIG. 14 shows a space-imaging device for terrestrial and outer space applications. It is mainly a 2π-3D solid angle imaging device, with angular selectivity. A plurality of such devices may generate a 3D image in spherical coordinates. The sensitive cylinder or prism 1400 contains a multitude of planar or bent layers as shown in FIG. 13, concentrating the radiation to imaging points set on the hyper-surface 1401, equipped with the appropriate transducers, with some symmetry and access shape 1402. A ray 1404 is directed inside the set angles 1405 to a specific concentrator/imaging point. The same happens with the ray 1406 poised on the direction set 1407 towards the detector 1403. The shape, detector types, radiation selectivity criteria are construction details and are subject to customization.

Figure 15:
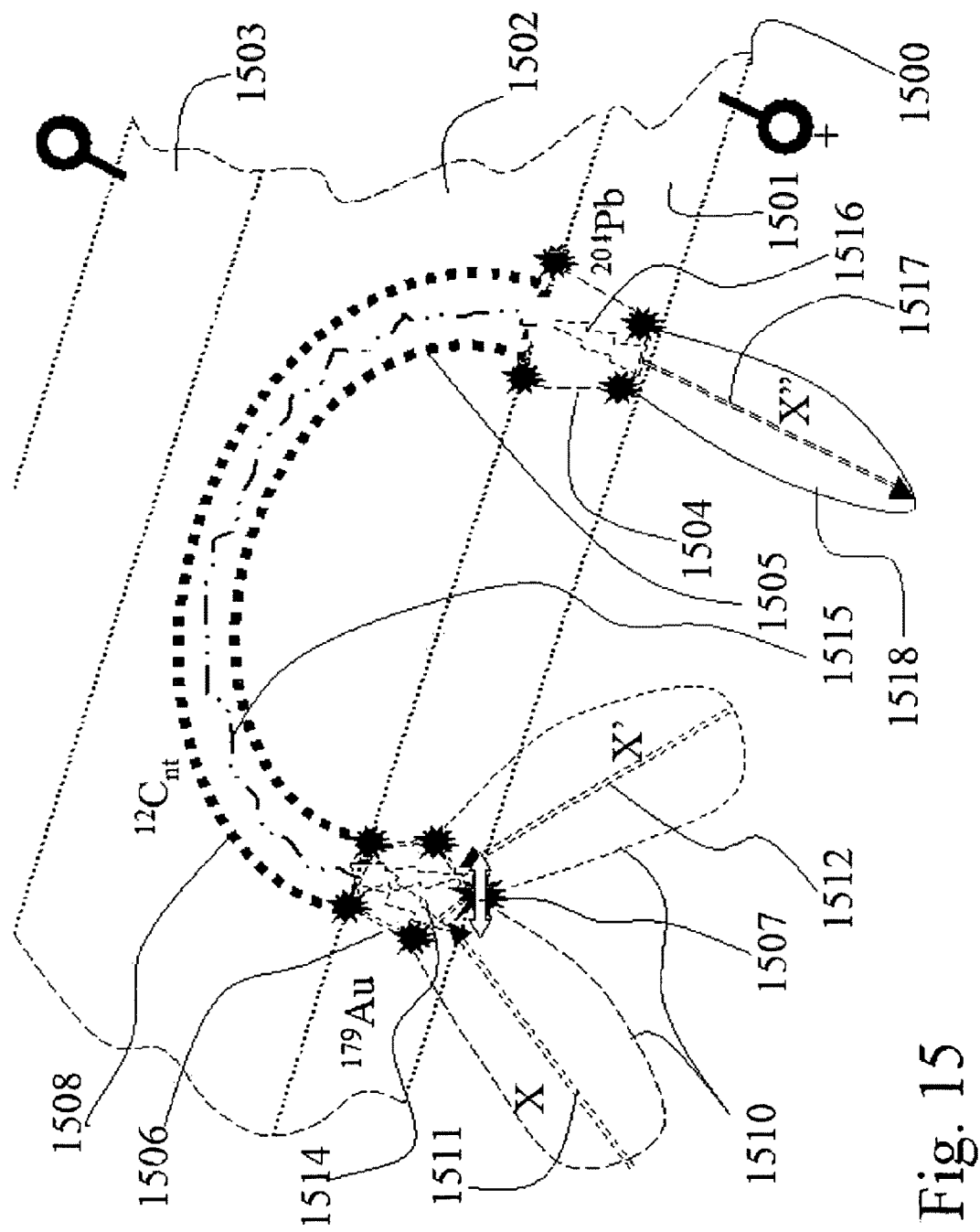
FIG. 15—The principle diagram of an "adapted" nano-tube wave-guide with controlled input aperture and directive output.

FIG. 15—shows how an adapted nano-tube wave-guide works as an example for the buildup of the molecular wave-guides. The material 1500 is made of a plurality of layers from which the figure shows only three of them. The admittance-exit layer 1501 is followed by the channeling-in nano-structure layer 1502, placed on a substrate layer 1503. A control voltage may be applied between the extreme layers or control layers 1501 and 1503, having as effect the displacement of the atom 1507 that interferes with the admittance path, and resonator input wave trapping device 1506 made from a nano-cluster of various materials and various geometries. The incident radiation coming from the direction 1511 or 1512 is trapped in the structure 1506 and injected in the nano-wave-guide 1508.

The radiation interacts slightly with the nuclei in the nano-tube that are seen at the grazing angle, being driven with almost no energy exchange towards the exit device 1504. This device matches the radiation determining its direction 1517 and the "cardioid's" 1518 shape (curve amplitude or probability of occurrence as function of exit angle) or exit angular distribution. The admittance "cardioids" 1510 are determined by the input adapting structure 1506 that makes the oscillation inside the nano-cluster 1514 adapted to be injected 1515 in the molecular guide.

After channeling inside the structure 1505 the wave gets into the exit adapter 1504 having a matching 1516 oscillation before departure. It is possible that, passing through this structure, the shape and energy of the photons (it has been experimentally proven that photons have a finite number of oscillations, in the range $10^3$ to $10^7$, and the amplitude distribution along the string (shape) varies as function of their creation, interaction and propagation) to be modified. The selectivity between the rays X 1511, X' 1512 and X" 1517 is a constructive detail. The structure is reversible if the input and output matching structures are properly arranged.

Figure 16:
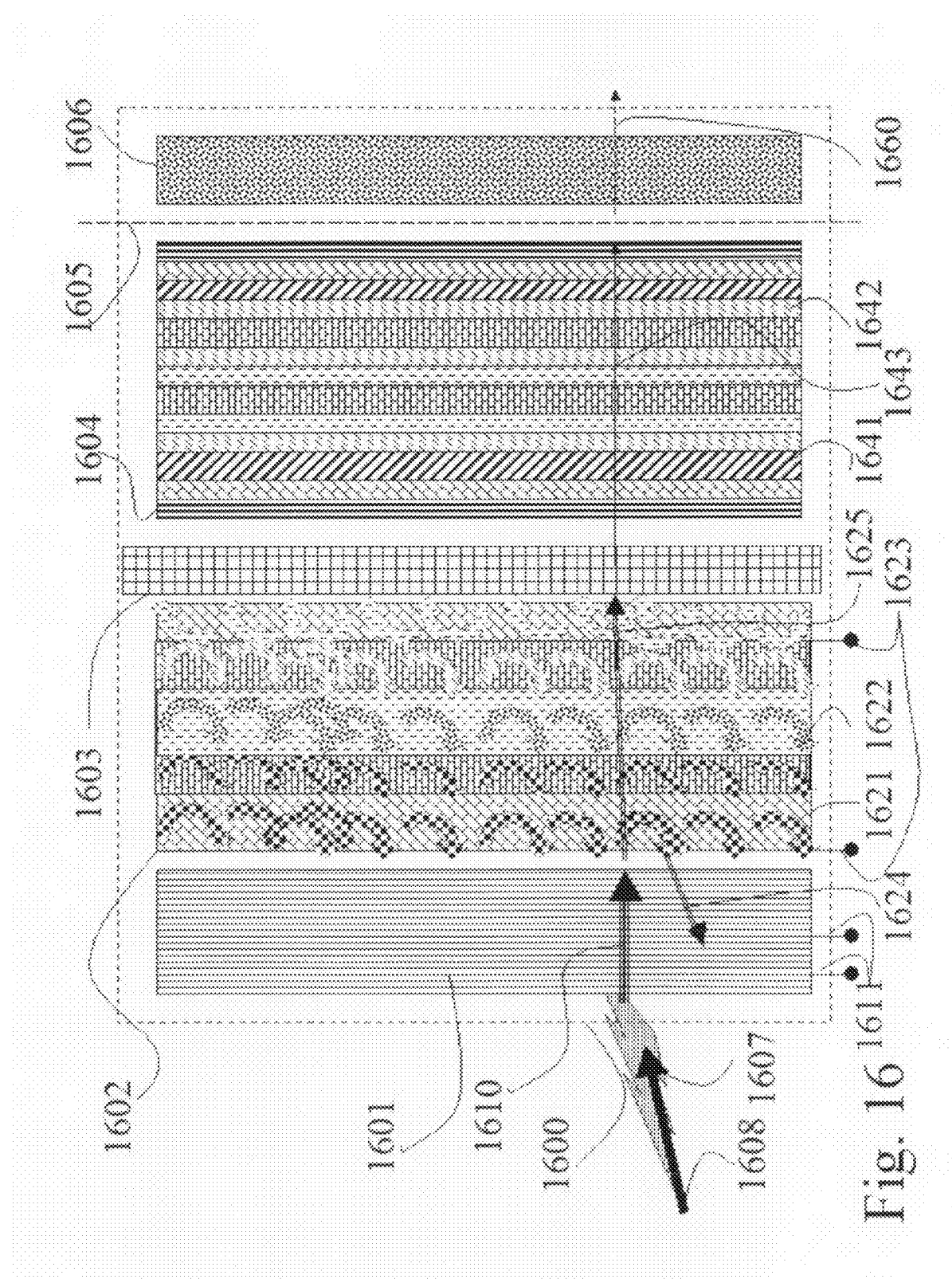
FIG. 16—The schematic diagram of a complete shielding structure made of a plurality of radiation guiding structures.

FIG. 16 shows the schematic view of a complete shielding structure section 1600. This is made of a plurality of layers 1601-1606 with various functions as denial or control of the radiation 1607 propagating towards 1608 the shield. The first layer 1601 may be used to harvest the energy from low penetrating radiation like charged particles up to MeV domain and electromagnetic field with energy less than few eV, delivering the energy as electricity at the plots 1611. It also acts as a protection for the next layer, depleting the radiation 1610 of its low penetration components, and may work as anti-chemical protective layer, too. This layer is not the subject of the present invention.

The next layer, an embodiment of the present invention, 1602 is made of a plurality of layers containing nano-tubes or organized nano-clusters 1621, 1622 adjusted for various particles and various angles and may be controlled by the voltage applied to the plots 1623. In this layer, the radiation 1610 is "back-reflected" 1624 by "gyrating" (turning) it inside the molecular wave-guides leaving a small amount of it to be transmitted 1625 through the layers.

The layer 1603 has mainly separation and mechanical resistance functions. The layer 1604 is redundant, making a supplementary gamma and n radiation absorption based on atomic absorption enhanced by nuclear resonance cascade as described in FIG. 3. The absorptive layers 1641, 1642 have various nano-micro layers of various isotopic enriched materials, which allows them to resonantly absorb the passing-by unidirectional radiation and reemit it in a broader solid angle, and by this mechanism to eliminate or dim the resonant bands from the incident radiation (gamma, n) 1643 spectrum. The layer 1606 may additionally be used redundantly as the last resort of protection, being based on mass absorption in degradation lattice as presented in FIG. 2, being mainly a usual shielding and not the object of this invention. The remnant radiation 1660 is supposed to be very low, with orders of magnitude.

The dashed line 1605 is a symmetry line for the case when the shielding arrangement is bi-directional. The symmetry line may be also build on the mechanical support layer 1603 for nuclear radiation control applications.

Figure 17:
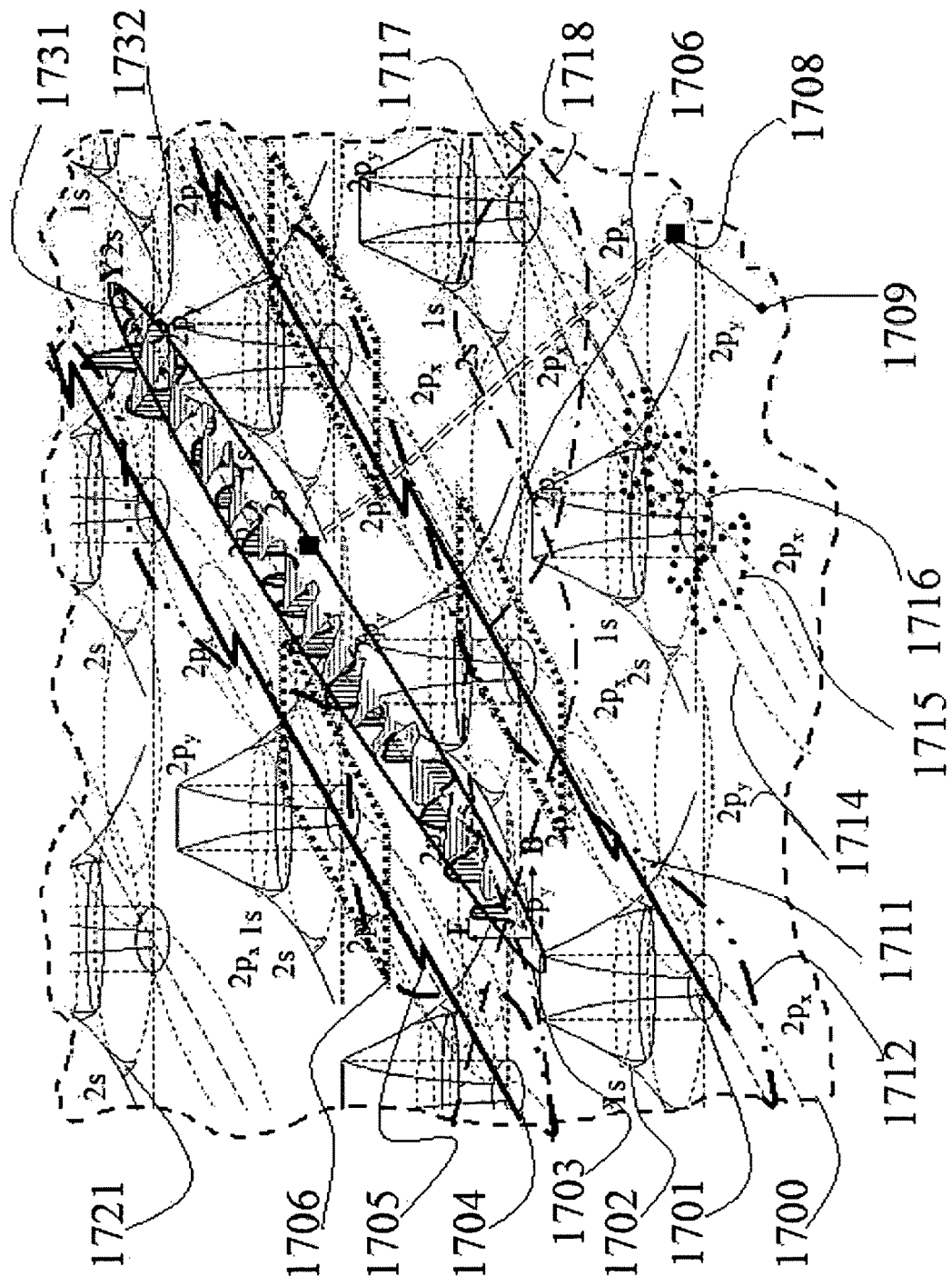
FIG. 17—An artistic view of the atomic level low energy gamma ray channeling in material nanostructures.

FIG. 17 shows another embodiment of the present invention related to the mechanism of atomic level radiation channeling through an atomic structure presented in a window 1700. The picture shows several atoms 1701 connected through chemical bounds at the $2p$ 1714 orbital level, like Carbon, which have been chosen in order to provide a simple example. The lattice might be a cluster, a nano-tube that has a specific cell dimension. The atomic electric potential curve 1702 starts at the nucleus 1701 where it has a high value decreasing fast with the distance, and being partially shielded by the electrons placed on atomic orbital $1s$, and $2s$ 1721, $2p$ 1711 and $2p$-bound 1714.

The atomic "channel" given by the atoms alignment 1704, is bent left by a gap 1705 determining the radius of curvature of the structure by using the equation:

$$\alpha = \frac{\Delta y}{A} = \frac{A}{R} \Rightarrow R = \frac{A^2}{\Delta y}$$

If keeping a smaller than 2 degrees for an interatomic distance of 3 Angstroms=A, ($sp^2$ bound in CNT is 1.41 A) we get a radius R=20 nm. Of course this looks very small but is the lower limit a molecular wave-guide effect may occur. In reality the radiation wave 1703 has a finite length of several [nm] up to hundreds of [nm], depending on the production source, with a E; B profile wearing the signature of the primary source and the environment it passed through. In our example it has also a width and an envelope 1732 with the Poynting vector Y 1731 centered in the channel. The image resembles a ship in a strait. In normal environments between 250 and 400 Kelvin degrees the atoms have molecular vibrations at THz frequencies. Though the atoms have not fixed locations as figured by the alignment axes 1704, but likelihood places figured by the rectangles 1706 where in plain they describe a combined oscillatory movement similar to Lissajous trajectories, under the action of the figured in plane oscillations 1717 on z axis, 1718 on y axes and 1712 on XZ. In reality these movements have to be treated in volume and a plurality of specific eigen-frequency in THz domain, specific to all molecular vibrations. These movements may make the wave-guide impractical above a certain temperature, because the atoms may interpose with the wave driving to a nuclear collision effect known under the name of Doppler broadening.

This effect generates Compton recoil electrons 1708 that stops far in the lattice by generating a cascade 1709 accompanied by X rays, and energy and direction modification becomes uncontrollable.

This imposes the following requirements for the guiding structure:

The nanowire to be straight and long, free of sudden curls, while the gap on the rotational axis to be a rational number so during a twist around its symmetry axis the molecules to cover all the space.

The nano-structure has to be as compact as possible and with high electron density, such as the fields constrain to be big enough "to bend" or stir the radiation wavelet and keep it inside the channel.

There is possible to vary the isotope in such a manner to create a funnel and control the exit of the particle with its associated wave from the channel.

The chemical stability and the molecular strength have to be high so that the amplitude of the molecular vibration to be small enough to require no cryogenics.

The developed nano structures have to be made as compact as possible to stir radiation with wavelength shorter than their interatomic distance.

Figure 18:
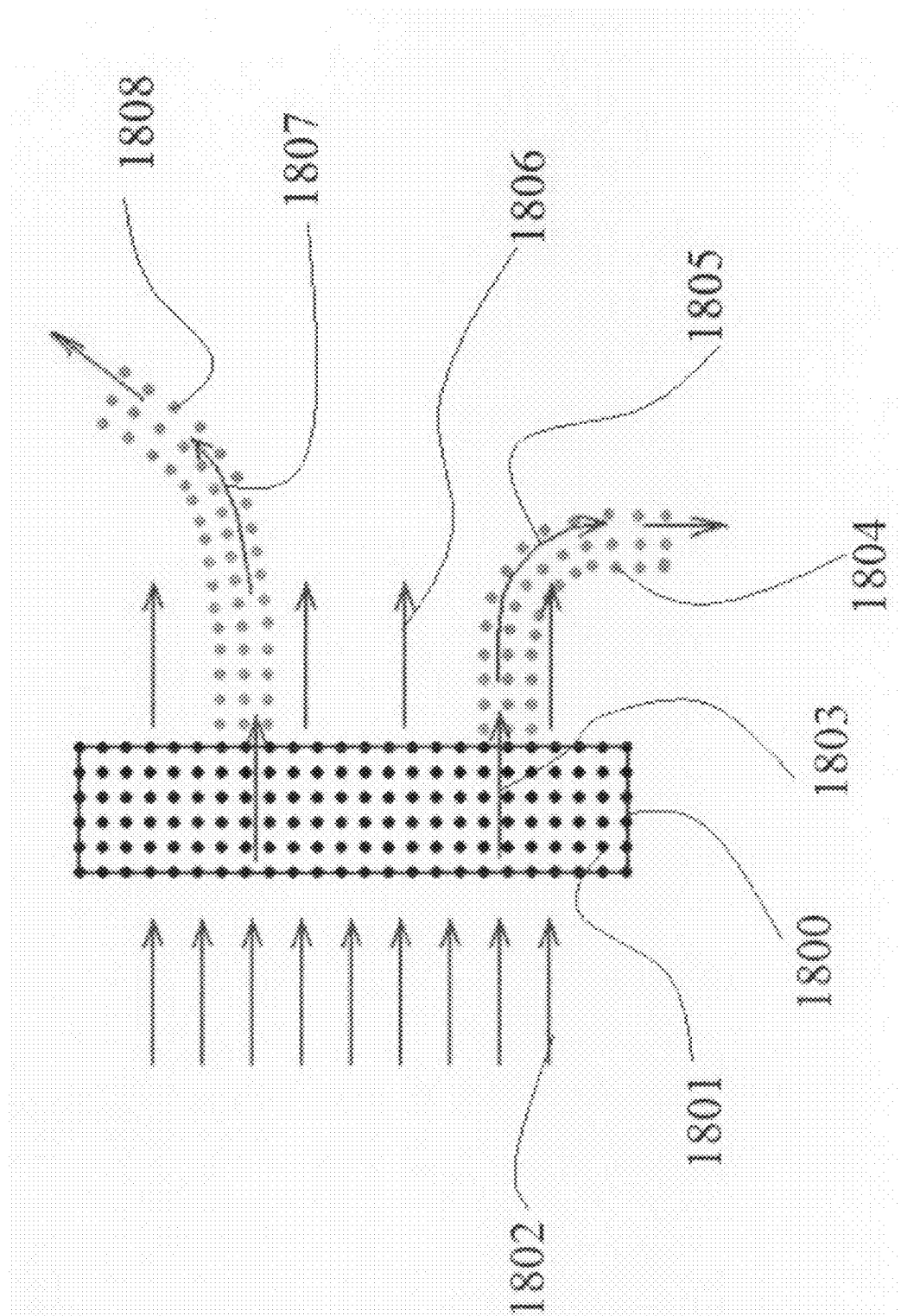
FIG. 18—The schematic diagram of a radiation selective extractor/gyrator element.

FIG. 18—shows another embodiment according to the invention application to build a radiation selective extractor/gyrator 1800.

A radiation beam 1802 of composed radiation reaching the target 1801 may be separated on types of incident radiation that may be further extracted from the "hot area" by tuned guiding tubes 1804, 1808, driving it to different receivers.

The radiation may be a mixture of n, gamma (neutrons decay becoming p, e, for travel times greater than ½ hour due to n disintegration). It is possible to develop a communication system that relies on the n emitter modulation, ovelaped with gamma that travels with different speeds being necessary at receiver to separate the gamma from the rest of the radiation in order to get the desired signal. Their overlap on target receiver makes the decoding hard due to physical properties of the signal that have to be extracted from the high-energy radiation background.

This kind of communicator is also usable in high radiation environment where the noise 1805 may be distinctly extracted and separated from the real information-carrying signal 1807. The system is transparent to the radiation that is not matching the extraction conditions for the path 1806.

The nano-structured entry interface 1801 takes all the radiation that is falling on receiver 1803 to the input of the specialized extraction guides acting like filters. This device may use the signal decoders for imaging and communication purposes. The radiation modulation might be done with the electro-sensitive radiation transport device shown in FIG. 9.

Figure 19:
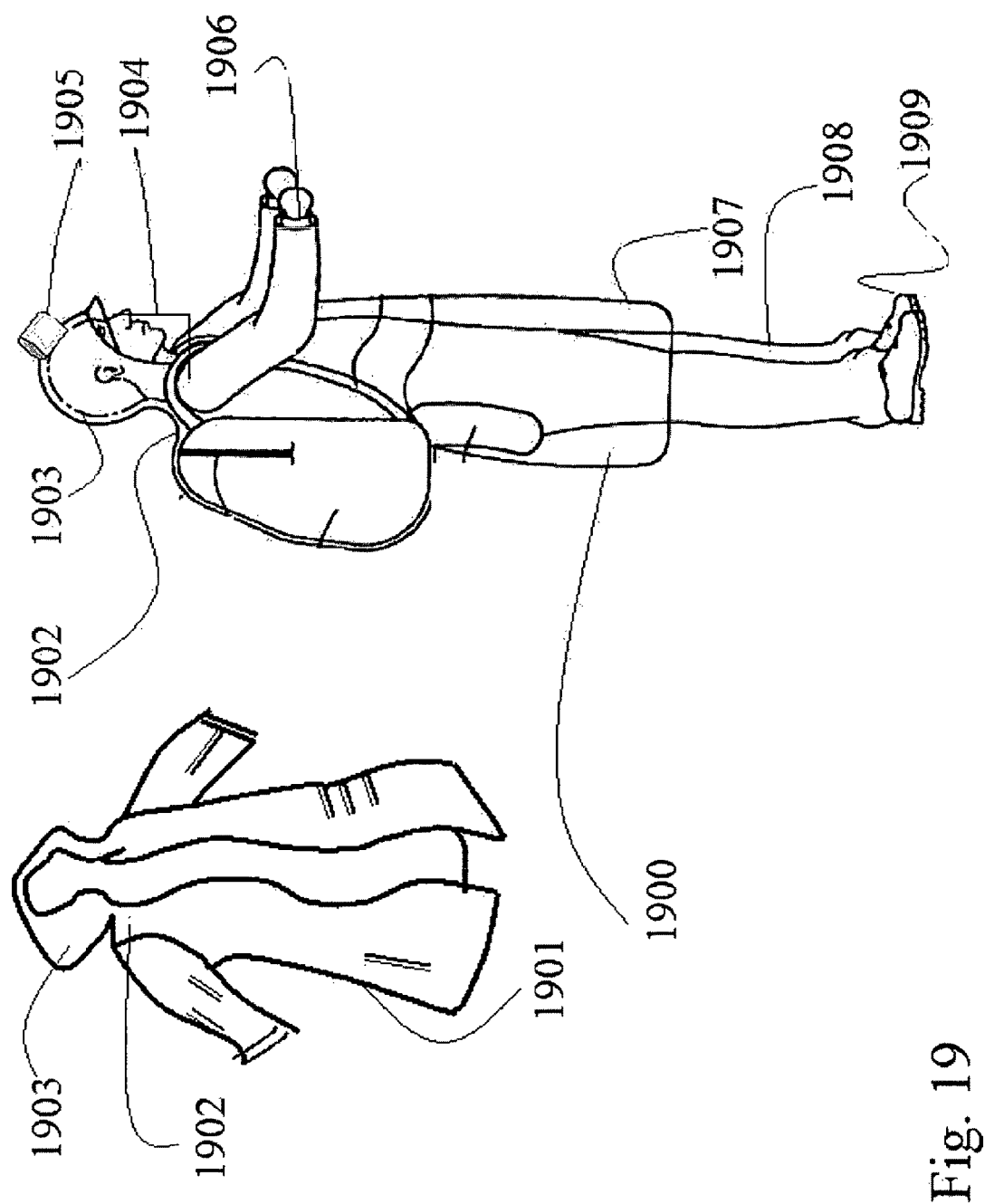
FIG. 19—The image of a radiation raincoat-like individual protective equipment based on multi-layered radiation shielding by guiding and diverting.

In FIG. 19 is shown another possible application of the thin radiation-guiding based shield for a whole body protective coat 1900, formed by the upper body coat 1907 and pans 1908 with protective shoes or boots 1909.

The coat 1901, 1907 may include helmet or hood 1903, and a backpack 1902 for survival and instrumentation. The face protection may have a face protection shield 1904 that may be transparent for eyes or completely opaque equipped with complex orientation system 1905, giving the images of the terrain in various bands and radiation. The gloves 1906 may have various degrees of flexibility and protection. The advantage of this suit is that it may exhibit attenuation coefficients up to ppm level and weight by 100 times less than it would if being fabricated by the current technology using mass-attenuation based materials.

Some flexibility will be possible in the suit. The suit may be used in various configurations and circumstances for individual protection such as military suit, security first intervention, hazmat environments, outer space for astronaut suit or for outposts shielding, for shelter in place, portable emergency vehicles, etc.

FIG. 20 shows a complex application of these active shields 2000 in making lighter and smaller the nuclear power source, like fission, fusion and hybrids nuclear reactors. The entire assembly is contained into a technologic case 2001, built for mechanical resistance and shielding purposes, able to contain pressure and heat. The total reflection external shield 2002 is reflecting all the particles coming from the central hot area back towards inside, keeping the radiation together in a small confinement zone. Immediately near the absorber is placed a multipurpose cooled absorber material 2003 making a sealed structure able to confine pressure and heat, up to a limit where it has a controlled release. A direct conversion layer and a gamma absorber material form the absorber 2003. It also contains fission products chemical stabilization materials. The next containment layer is used for breeding control being an adjustable reflection shield 2004 that is driving the neutrons to the absorption layer 2003 or towards inside in the fertile blanket having the function of controlling breeding and transmutation rate. When the structure is electrically polarized, is acting as a reflector driving the escaped particles back inside to be used for breeding or power production, while is transparent and leaves particles escape in the absorption blanket 2003. The breeding nano-structured-material 2005 contains $^{232}$Th, $^{238}$U, or may contain other materials for radioisotopes production by transmutation. In order to maintain a constant reactivity in this area, the transmutation products will be removed from the production area in a storage/cooling compartment outside the active zone. The reactor's power control adjustable-reflection shield 2006 is made form the active "miu-switch" material, whose transmittance and reflection (also called albedo) is adjusted using an electronic control system for criticality 2007, that together with the breeding control system 2008 assures the neutron 2009 flux management, establishing their trajectories 2010 and their range. All the functions are automatically controlled in order to balance the power output at the plots 2011 to meet the power demand.

FIG. 21 represents an example of a mobile, portable nuclear power source 2101, based on reflective, active nano-shielding 2102 that may lead to advanced nuclear sources, like for example a 239 Pu fueled nuclear reactor reaching the criticality with less than 50 g of fissile material. The produced power is transmitted to electric motors 2103 in the wheels that makes part of the integrated vehicle power system 2100.

Other examples of mobile applications are trains, ships, planes, super-planes space shuttles and underwater devices.

BRIEF DESCRIPTIONS OF INVENTION

The present invention refers to a new type of active nano-structured material to be used for X, gamma and neutrons shielding that may have the capability to electronically control the flux reflected or transmitted through it. The patent is a development from the current super-mirror used in synchrotrons X ray focusing and cold neutron transport at spallation sources using active nano-structures. Another idea used in the patent approach relies on the fact that the interaction between high-energy radiation and materials is very weak except for nuclear resonances. Such resonant materials may have small thickness but may generate high absorption rates.

The equation 1 is characterizing the classical mass absorption process, including resonant materials:

$$I(E_j)=I_0(E_j)\exp(\mu_r x^i + \delta_j^i \mu^i x^i) \qquad \text{Eq. 1}$$

where I is the intensity in a point x on the axis for an energy belonging to the energy group j, and i is an index counting the attenuator materials in the shield. The "Kronecker delta" is suggesting that only for the resonant energies an extra term may be added to count for resonant absorption and reemission of radiation similar to scattering.

The energy group "j" width is set to be equal with the resonance's effective width (something like $n\sigma$ where n is a reasonable value usually smaller than 3 and sigma is the distribution parameter). $\mu$ is the linear absorption coefficient absorbing the value $$\frac{\mu}{\rho}\rho_i$$

where $\mu$ is the material specific absorption density while $\rho$ is the material mass density and $\rho_i$ is the specific material density spanning the length $x_i$.

Using this concept there is possible to make arrangements of various materials resonantly absorbing the incident radiation, activating the internal nuclear channel and de-exciting by following the nuclear branching paths. There are very few cases when the excited nucleus is emitting a higher energy than it absorbed, therefore the new material becomes a new source of radiation in that bandwidth backscattering theoretically 50% of the primary radiation. If consider two repetitive layers separated by a distance they theoretically cut down 75% of the radiation by backscattering. The disadvantage of these materials is that the resonance band is very narrow, therefore a sandwich is required to cut down most of the energetic groups. The nature did not provide so many stable isotopes as we may need to make an efficient resonant shielding for high energies. Radiation buildup is also important but is considered a secondary effect for this approach. This is what is already known and serves as background for this invention.

The usage of the concept of radiation reflection at grazing angles together with the fact that the radiation interaction with the surface is local, involving few tens of atoms, led to the conclusion that a nano-tube slightly bending, see FIG. 17 may offer the same conditions, and more, it may contain the radiation inside and slightly centered in the tube. The nano wires are naturally bending and so does the radiation trapped inside. One problem to be solved is the small admittance for trapping radiation inside the molecular wave-guides, which is solved by growing structures like fullerene that will divert the radiation inside, as described in FIG. 15.

FIG. 1 describes 3 types of shielding. The novelties brought by this patent are the nuclear resonance enhanced absorption and the molecular wave-guides radiation "gyration".

If the resonance enhanced radiation absorption and reemission described in FIG. 3 brings a passive shield with maximum 1-2 orders of magnitude thinner than the classical mass absorption current shielding described generically in FIG. 2, the new radiation gyration by molecular wave-guides described in FIG. 4 opens new perspectives.

As FIG. 5 shows, there is necessary to build organized nano-structures, in order to create the so-called molecular-guide structures. These structures may be build in many ways, but for simplicity, one way to build is by starting from a Si or Diamond substrate, building by beam-annealed Au self organized nano-clusters, and building a layer of carbon nano-tubes, slowly bent in about 500 nm to 1 micron. Over this layer a new conductive micro layer is deposited as TiO and W, or WC follows by pulsed laser deposition than by Au, Ag deposition. This substrate will create the germination for the new set of C nano-tubes deposited by CVD, slightly tilted than the first. In this way a plurality of substrates may be build.

Another modality of building the organized structure is to perform a combined CVD and Laser Pulsed Deposition, assisted by an interfered ion bean on a 10 nm pattern to create the thermal spikes to induce the nucleation of the nano-clusters and separation of the depositions. In this structure the organized layers of nano-clusters will float in an insertion material, also partially crystallized. The insertion of a piezo material as BaTiO4 by LPD or a ferro-electric material as TGS brings the possibility of the electric control of the radiation direction by obtaining the molecular wave-guide switches.

As already resulted from FIG. 5 and in the molecular switch version presented in FIG. 8 there is difficulty to achieve this effect by using few atoms. A collective action with the participation of few thousands atoms is needed to completely gyrate neutrons with energy up to few MeV or gamma rays as detailed in FIG. 17.

In the case of the gyration by 180° of the radiation of few MeV on 1000 atoms, an energy exchange of several tens of eV will be transferred to lattice due to momentum transfer. This is enough to warm-up that channel and the structure to require cooling.

The formula is:

$$p = 2\frac{E}{c} = nMv \rightarrow v = \frac{2E}{cnM} \Rightarrow \Delta E = \frac{2E^2}{c^2 nM} = nk_B T \qquad (3)$$

that in the case of 1 MeV radiation turned by 1000 atoms gives about 2.5 eV, leading to a 3°K equivalent temperature increase per particle.

This is not so bad showing that high doses may be handled by this mechanism without significant radiation damage effects. To calculate the radiation damage the isotopic specific interaction cross-sections have to be considered. Without doing this, we observe that in the radiation admission interface small cross-section materials have to be used to channel the radiation inside the nanostructure. The particularity of the channeling process exploited in the present invention consists in the fact that the radiation quanta interacts mainly with the collective atomic electric field and not directly with the nuclei, making the interactions smaller than in the case of nuclear interaction The application of this material in communications applications, as shown in FIG. 18, uses the selectivity and electric control that makes possible the modulation of the emitter and the use of direct radiation energy conversion in electricity systems, having a fast response necessary for detection and demodulation. The high sensitivity of detectors and low absorption of the neutrons and gamma rays in materials makes possible the signal transmission through shielding materials and high radiation absorbers.

The usage of these active radiation guiding materials inside a nuclear reactor is making possible the replacement of the mechanical control rods by electrically controlled "albedo" materials, increasing the neutrons usage and making an optimal management of breeding, transmutation and partitioning processes. The nuclear waste and structural materials contamination will be drastically reduced. This will lead to major changes in the nuclear reactor structure and design. Same active radiation nano-guide structure might be used to enhance fusion structures, accelerator driven nuclear reactor structures and hybrid nuclear reactor structures.

What is claimed is:

1. A nuclear radiation and nuclear particles guiding material comprising:
   a) a plurality of layers containing nanostructures, the nanostructures having the role to confine, guide and gyrate the nuclear radiation;
   b) a plurality of layers comprising piezo-electric, ferro electric or magneto-electric material that changes the direction of the guided nuclear radiation inside the guide as a function of an electric signal applied on said material;
   c) a plurality of layers having materials sensitive to the nuclear resonance of the radiation, wherein a selective nuclear radiation resonant absorber is formed therein and
   d) a plurality of layers, fabrics or inserts to increase the chemical or heat resistance, as well as the resistance to radiation with energy lower than that of x-ray radiation energy.

2. A radiation guiding material according to claim 1 made of a nano-structure that admits nuclear radiation and is steering it inside, guiding it, and releasing it in another direction.

3. A nuclear radiation guiding material according to claim 1 acting as a nuclear reflective layer made of a plurality of nano-cluster structures, connected in order to form an internally charged space to channel and guide the high frequency electromagnetic field along the channel by gyrating in a controlled manner.

4. A radiation guiding material according to claim 1 made of an entry atomic structure matched with the guiding structure, offering a hollow cavity able to admit nuclear radiation increasing the incidence admittance angle.

5. A radiation guiding material according to claim 1 comprising an assembly of wave-guide channels, admitting the radiation from a large incidence angles and sending it in a controlled direction in a narrow exit angle.

6. A radiation guiding material according to claim 1 made of at least one material sheet that channels the nuclear radiation coming from a preferred direction and exhibits normal attenuation properties for all other incidence angles.

7. A radiation guiding material according to claim 1, used to create nuclear radiation shielding.

8. A radiation guiding material according to claim 1 comprising a structure containing electro sensitive layers able to change the channeling structure according to an applied voltage to provide alternate exit possibilities depending on the control voltage.

9. A radiation guiding material according to claim 8 forming a controlled shielding panel applied to control the flux or energy harvesting in fission, fusion and mixed reactors, as in energy generation by nuclear means as annihilation.

10. A controlled radiation guiding material according to claim 8 forming a multi-nano-structured-layer nuclear radiation flow control device to be used for X and gamma, particle ray modulation-demodulation communication, and imaging systems.

11. A radiation guiding material according to claim 8 mounted to form a combined structure of radiation funneling and nano-focusing.

12. A controlled radiation guiding material according to claim 8 mounted in a combination of active, electronically controlled and passive nuclear guiding structures to enhance or replace the nuclear reactors criticality control mechanical rods that makes the neutron management and external shielding.

13. A radiation guiding material according to claim 1 made of an assembly of molecular wave-guide channels that grabs the radiation from a large incidence angles and sends it in a controlled angle to concentrate it.

14. A radiation guiding material according to claim 1 made of an assembly of nano-channeled structures that drives the radiation in different directions, the directions being electronically controlled or switched.

15. A radiation guiding material according to claim 1 made of an assembly of neutron channeling devices forming sectors with transmission or reflection controlled by a voltage to control the criticality of a nuclear reactor structure.

16. A radiation guiding material according to claim 1, made of an assembly of directive structures, used to admit and guide the radiation from an admittance solid angle towards a single point, used for imaging.

17. A radiation guiding material according to claim 1, fabricated as a material sheet, offering channeling properties for a preferred direction and normal attenuation properties for all other incidence angles.

18. A radiation guiding material according to claim 1 used in a combination as panel elements a to create a multi-layer gamma ray imaging device.

19. A radiation guiding material according to claim 1 mounted in a repetitive microstructure to be used for shielding of space shuttles, outposts, nuclear power generators on board.

* * * * *